(12) United States Patent
Robinson

(10) Patent No.: US 11,711,626 B2
(45) Date of Patent: Jul. 25, 2023

(54) SIGNAL DELAY MEASUREMENT

(71) Applicant: HITOMI LTD, Cookham Dean (GB)

(72) Inventor: James Neil Robinson, Bourne End (GB)

(73) Assignee: HITOMI LTD, Cookham Dean (GB)

(*) Notice: Subject to any disclaimer, the term of this patent is extended or adjusted under 35 U.S.C. 154(b) by 0 days.

(21) Appl. No.: 17/753,676

(22) PCT Filed: Sep. 7, 2020

(86) PCT No.: PCT/EP2020/074971
§ 371 (c)(1),
(2) Date: Mar. 10, 2022

(87) PCT Pub. No.: WO2021/048065
PCT Pub. Date: Mar. 18, 2021

(65) Prior Publication Data
US 2022/0353444 A1 Nov. 3, 2022

(30) Foreign Application Priority Data
Sep. 10, 2019 (GB) .................................. 1913048

(51) Int. Cl.
*H04N 17/00* (2006.01)
*H04N 25/531* (2023.01)

(52) U.S. Cl.
CPC ......... *H04N 25/531* (2023.01); *H04N 17/002* (2013.01); *H04N 17/004* (2013.01)

(58) Field of Classification Search
CPC .. H04N 17/004; H04N 17/04; H04N 17/0002; H04N 25/531
See application file for complete search history.

(56) References Cited

U.S. PATENT DOCUMENTS 6,141,042 A * 10/2000 Martinelli ............ H04N 17/004
348/192
8,358,375 B2 * 1/2013 Ikeda .................. H04N 21/8106
348/515

(Continued)

FOREIGN PATENT DOCUMENTS

| CN | 106851259 A | 6/2017 |
|----|-------------|--------|
| EP | 0888019 A1 | 12/1998 |
| EP | 3171593 A1 | 5/2017 |

OTHER PUBLICATIONS

Search Report for GB Application No. 1913048.3 dated Jul. 20, 2020.

(Continued)

*Primary Examiner* — Brian P Yenke
(74) *Attorney, Agent, or Firm* — Maschoff Brennan

(57) ABSTRACT

A method for rolling shutter compensation during signal delay measurement, comprising displaying a video test pattern on a display, said video test pattern having a temporal event; capturing a video of the display, by a camera; monitoring a plurality of regions of the display in the video; detecting times (1230, 1240) at which the temporal event appears in each monitored region of the display in the video; and extrapolating the detected times (1230, 1240) to calculate the time (1250) at which said temporal event would appear at a selected region of the video.

20 Claims, 15 Drawing Sheets

(56) References Cited

U.S. PATENT DOCUMENTS

| | | | | |
|---|---|---|---|---|
| 8,525,884 | B2* | 9/2013 | Steinberg | H04N 13/194 348/192 |
| 8,525,885 | B2* | 9/2013 | Steinberg | H04N 17/04 348/192 |
| 8,665,320 | B2* | 3/2014 | Holley | H04N 17/04 348/53 |
| 8,810,692 | B2* | 8/2014 | Ubillos | H04N 19/86 348/241 |
| 8,913,140 | B2* | 12/2014 | Zhou | H04N 23/683 348/208.4 |
| 9,077,961 | B1 | 7/2015 | Saltzman | |
| 9,380,297 | B1* | 6/2016 | Djurdjevic | G06T 7/80 |
| 9,996,914 | B2* | 6/2018 | Chui | G06T 15/205 |
| 10,012,504 | B2* | 7/2018 | Roumeliotis | G01C 21/1656 |
| 10,068,363 | B2* | 9/2018 | Laaksonen | G06T 7/73 |
| 10,147,433 | B1* | 12/2018 | Bradley | G10L 19/018 |
| 10,236,031 | B1* | 3/2019 | Gurijala | G10L 19/018 |
| 10,254,118 | B2* | 4/2019 | Roumeliotis | G01C 21/185 |
| 2002/0140719 | A1* | 10/2002 | Amir | H04N 21/6587 707/E17.009 |
| 2005/0057663 | A1* | 3/2005 | Thomas | H04N 9/75 348/222.1 |
| 2007/0223874 | A1* | 9/2007 | Hentschel | H04N 21/4394 348/E5.122 |
| 2008/0263612 | A1* | 10/2008 | Cooper | G11B 27/3045 725/116 |
| 2012/0019633 | A1* | 1/2012 | Holley | H04N 17/04 348/E9.034 |
| 2012/0287288 | A1* | 11/2012 | Steinberg | H04N 17/04 348/181 |
| 2012/0287289 | A1* | 11/2012 | Steinberg | H04N 17/004 348/181 |
| 2012/0287829 | A1 | 11/2012 | Steinberg et al. | |
| 2015/0369609 | A1 | 12/2015 | Roumeliotis et al. | |
| 2017/0147622 | A1* | 5/2017 | Sterzbach | G06F 16/2365 |
| 2022/0345689 | A1* | 10/2022 | Robinson | H04N 5/067 |

OTHER PUBLICATIONS

International Search Report for International Application No. PCT/EP2020/074971 dated Dec. 23, 2020.

* cited by examiner

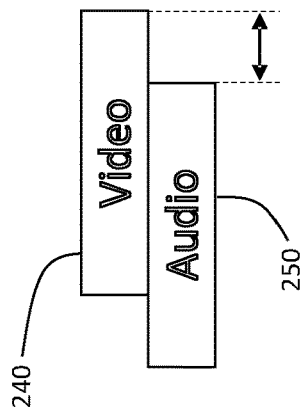
FIG. 2A
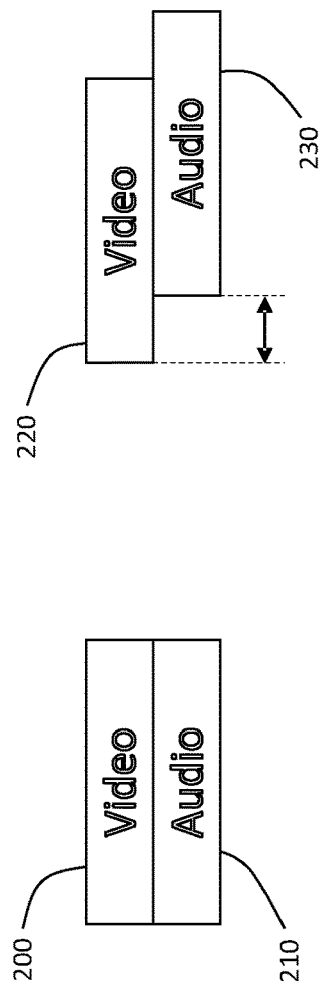
FIG. 2B
FIG. 2C
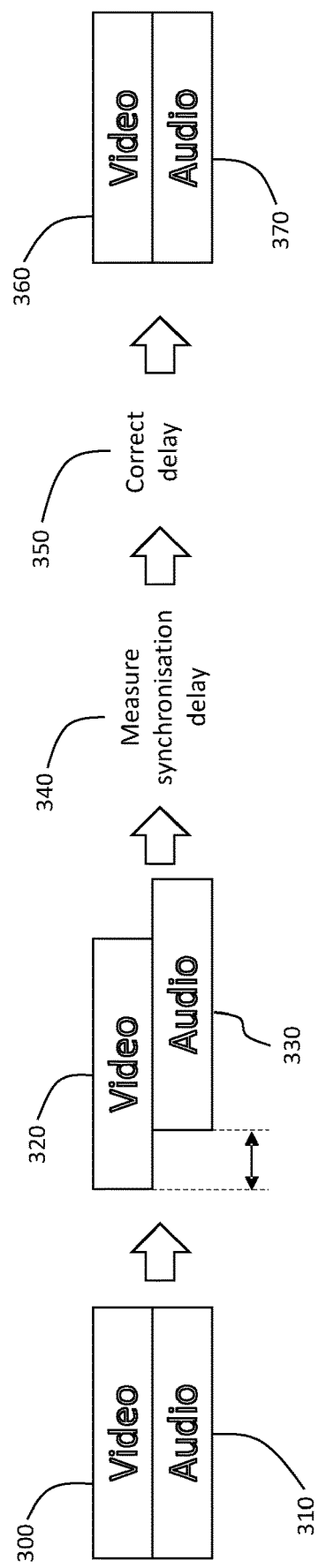
FIG. 3

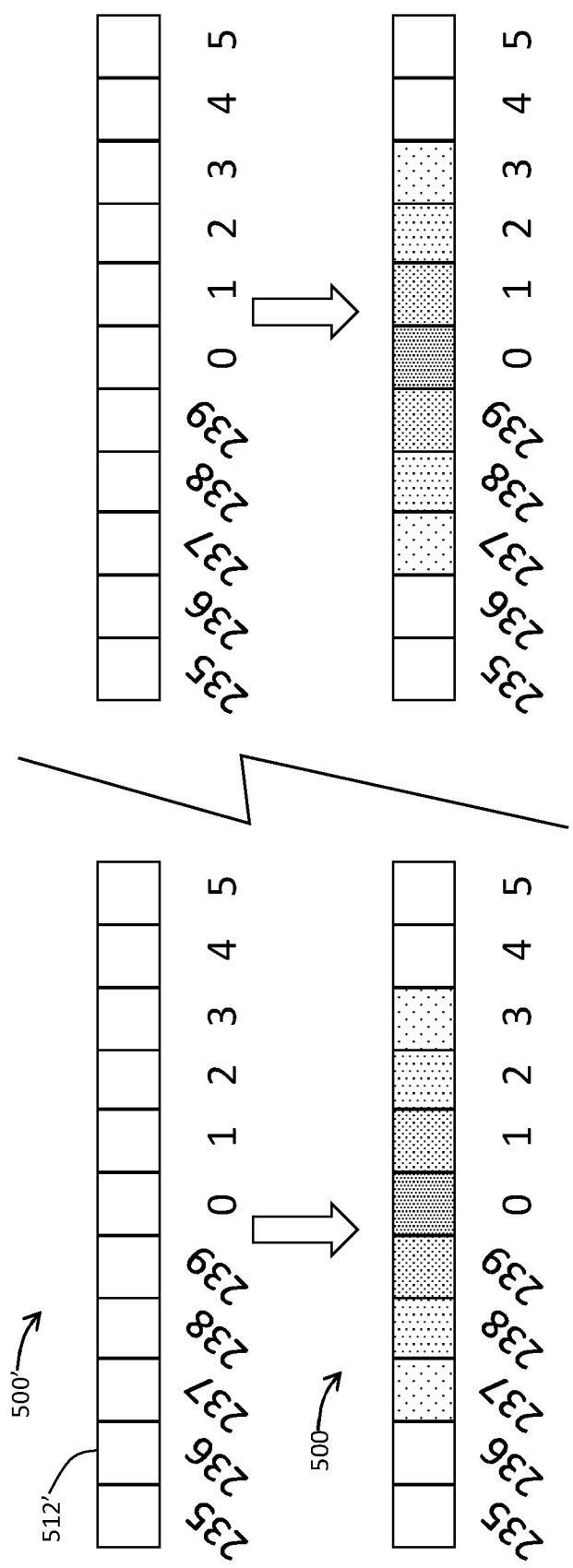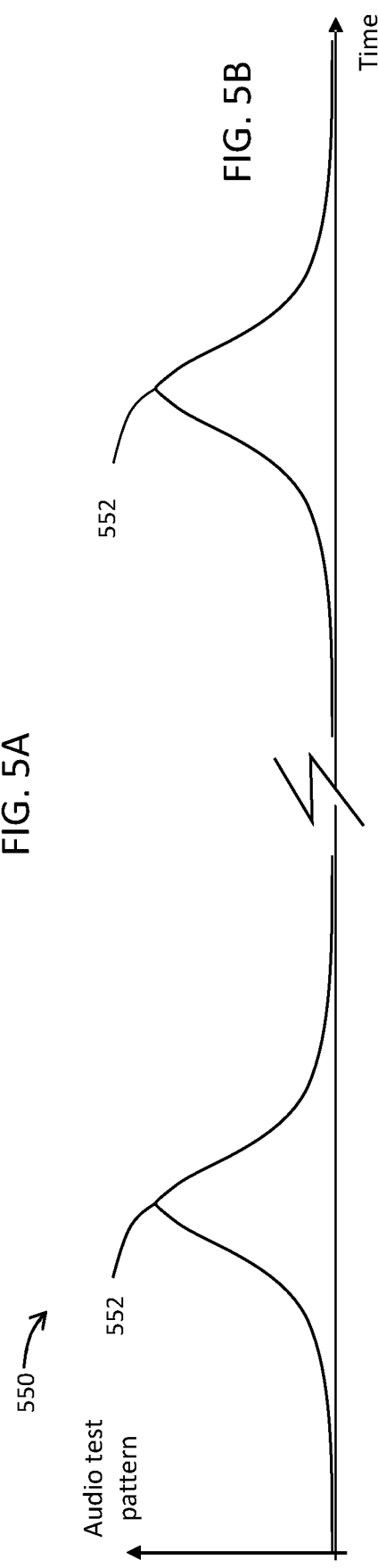

SIGNAL DELAY MEASUREMENT

TECHNICAL FIELD

The present invention relates to signal delay measurement in a broadcast network and in particular to compensating for rolling shutter in a camera during video delay measurement.

BACKGROUND

In television broadcasting, an audio signal and a video signal may be transmitted across a broadcast network. Typically, the signals are sent over a processing chain or a chain of equipment before finally arriving at a signal receiver. During such transmission, the audio and video signals may each be subject to differing amounts of temporal delay. This means that at the receiving end of the broadcast network, the signals are not synchronised with each other. This can be undesirable for many reasons. For example, in a video in which an actor is speaking, the movement of the lips of the actor as visible in the video is not synchronised with the sound of the words being spoken by the actor. This is referred to as "lip-sync" error.

In a scenario such as a football match, the game may be captured from many different locations in the stadium, so that viewers of the captured footage can see the game from many different angles. One camera may be located above the stadium, another camera may be located on a north side of the stadium, and other cameras may be located respectively on south, east or west sides of the stadium.

As in other scenarios, the video signal and the audio signal as captured in each individual location around the stadium must be synchronised with each other. However, in the scenario of the stadium, an additional requirement is that the signals of the plurality of cameras around the stadium must also be synchronised with each other.

A common method to measure audio-video delay in a television signal is the use of audio and video "test patterns". An audio test pattern and a video test pattern are developed such that the audio test pattern has sounds that are to occur at the same time as certain elements of the video test pattern. The test patterns are sent over the broadcast network to an analyser. A plurality of analysers may be deployed, at different points in the broadcast network chain. The analyser is capable of determining the delay between the audio signal and the video signal by processing the temporal development of the audio and video test patterns as received over the broadcast network. For example, the delay between a particular sound in the audio test pattern and a particular element of the video test pattern can be used to calculate audio-video delay.

The delay between different video signals may also be determined in a similar way, using video test patterns comprising timed events. In general, the delay between a video signal and any other type of signal may be of interest.

In some existing solutions, the audio and video test patterns are generated by a portable electronic device, such as a smartphone or tablet. For example, a camera is used to record the screen of a smartphone and a microphone is used to record the audio output of the smartphone, whilst the smartphone is displaying a video test pattern and playing an audio test pattern. The signals from the camera and the microphone are transmitted across the broadcast network to an analyser where the delay between audio and video is determined as described above. The analyser may be located at any point in the broadcast network chain.

Many modern cameras use a "rolling shutter" technique to record video frame sequences. This is contrasted with "global shutter" techniques. A global shutter mechanism works by capturing an entire image frame in a single instant. A rolling shutter mechanism is a mechanism wherein each frame of a video is captured by scanning the field of view rapidly, for example horizontally or vertically. Thus, in a rolling shutter mechanism, not all parts of an image frame are captured at the same instant.

When a camera is used to record a video test pattern for the purposes of measuring audio-video delay, or the delay between a video signal and another generic signal, the rolling shutter mechanism introduces errors in the delay measurement. In particular, because not all parts of the image frame are captured at the same instant, the measurement of the relative timing of, for example audio and video signals, is made more complex.

The inventor has appreciated the problems associated with using a camera having a rolling shutter mechanism when attempting to measure the delay between an audio test pattern and a video test pattern, between a video test pattern and another video test pattern, or in general between a video test pattern and another signal. It should be noted that the inventors' present solution would work with cameras having both rolling shutter or global shutter behaviour. Toward this end, the inventor has invented a product and a scheme for overcoming this problem.

SUMMARY OF THE INVENTION

According to a first aspect of the invention, there is provided a method for rolling shutter compensation during signal delay measurement, comprising:
 displaying a video test pattern on a display, said video test pattern having a temporal event;
 capturing a video of the display, by a camera;
 monitoring a plurality of regions of the display in the video;
 detecting times at which the temporal event appears in each monitored region of the display in the video; and
 extrapolating the detected times to calculate the time at which said temporal event would appear at a selected region of the video.

The present method is concerned with the use of a camera to capture a video test pattern for sending over a transmission link to an analyser. The video test pattern received by the analyser comprises a temporal event. The time of receipt of the temporal event at the analyser can be compared with a temporal event in another signal to ascertain the delay between the video test pattern and the other signal. To achieve this, the time of the temporal event in the video must be determined. However, in cases where the capturing camera uses a rolling shutter mechanism, the temporal event in the video test pattern will be captured at different times, in dependence on the update direction of the rolling shutter mechanism of the camera.

The solution uses an analyser to monitor different regions of the display as captured by a camera which may possibly be using a rolling shutter. Due to the possible use of a rolling shutter, the temporal event of the video test pattern may appear in different regions at different times to the analyser. The present solution considers extrapolating the times at which the temporal event appears in each region to a time at which the temporal event would appear in a selected region. This generates an approximation of the time at which the temporal event actually occurred (rather than the times at which the temporal event appeared to occur due to the rolling shutter mechanism).

The solution also applies to situations where a global shutter camera is used. In this, case, the extrapolation described above is a simple vertical line. The extrapolation process is described fully in the "Detailed Description" section below.

Advantageously, the present invention provides a single representative time of occurrence of a temporal event in a video test pattern captured by a rolling shutter camera, for use in measuring the delay between the video test pattern and other signals.

In some embodiments, said camera has an assumed update direction; and
   said plurality of regions are located at different points in the assumed update direction. By assuming an update direction of the camera, the cameraman can be "shutter agnostic" in the sense that the present inventive method works with a global shutter camera and a rolling shutter camera.

In some embodiments, the selected region is different to all of the monitored regions; in other embodiments, the selected region can be the same as one of the monitored regions.

In some embodiments, said display has a first update direction. In overlapping embodiments, said camera uses a rolling shutter mechanism with a second update direction. In overlapping embodiments, the second update direction is substantially perpendicular to the first update direction. In overlapping embodiments, said plurality of regions are located at different points in the second update direction.

In a preferred embodiment, said selected region corresponds to the centre of the captured video. This is advantageous because in practice, much of the activity in a video clip occurs towards the centre of the screen. For example, in embodiments where an audio signal is to be synchronised with a video signal to avoid "lip-sync" errors, because the lips of actors in movies generally appear towards the centre of the screen, it is most advantageous to resolve the time of the temporal event to when it would occur, in a rolling shutter camera, at a location at the centre of the screen.

In some embodiments, the temporal event corresponds to a peak, or another part, of a variable of the video test pattern; and
   optionally wherein said variable varies sinusoidally, as a polynomial or as a square wave over time.

Advantageously, the peak values of discrete variables that vary sinusoidally or as a polynomial can be calculated by means of interpolation, and the time of the peak value can be used as the time of the temporal event. In particular, by knowledge of the mathematical function that describes the temporal event, interpolation between samples of the discrete variable can be used to calculate the peak of the variable. Thus, the use of discrete periodic functions with peaks that can be easily calculated by interpolation, is advantageous.

In some embodiments, said variable of the video test pattern is the opacity or intensity of a colour of at least part of the video test pattern.

In some embodiments, said colour of at least part of the video test pattern is selected to be a point d on a line L, remote (for example, as remote as possible) from a plane P in 3D colour space, and wherein the colours of the rest of the video test pattern are selected from said plane P.

Advantageously, by letting the colours of the video test pattern fall within a plane P of 3D colour space, and by letting the colour of the pulse to be maximally distant from plane P, the pulse is made to be more or maximally distinguishable from the rest of the video test pattern.

In some embodiments, the colour space of the video test pattern is transformed by means of a colour space matrix transform so that two of the axes of the rotated colour space are parallel to plane P and the third axis is line L; in some preferred embodiments, the detection of the temporal event comprises detecting the colour of the video along said third axis L.

Advantageously, this reduces the complexity of the pulse detection as only the colour of the video along axis L must be monitored.

In some embodiments, said colour of at least part of the video test pattern is magenta or substantially magenta. For example, in decimal code, magenta may be represented by [R,G,B]=[128, 0, 128]. In this embodiment, the colours of the rest of the video test pattern are selected to be black ([R, G, B]=[0, 0, 0]), white ([R, G, B]=[255, 255, 255]) and a shade of blue ([R, G, B]=[41, 182, 255]), or substantially black, white and a shade of blue.

In some embodiments, the number of monitored regions is two; in other embodiments, the number of monitored regions is four. Any number of regions can be monitored in accordance with the present scheme.

In some embodiments, said display comprises a smartphone display or tablet display. Here, a smartphone may display a video test pattern and also play an audio test pattern. The analyser must then determine the delay between the video test pattern and the audio test pattern, by calculating the time of a temporal event in the video test pattern in accordance with the present method.

Using a smartphone display allows greater flexibility in the audio-video synchronisation process. For example, in an application where live audio-video is broadcast from a football game, a smartphone can be used "in-field" to generate, play and display the audio and video test patterns; the patterns can then be captured by a camera and a microphone, and subsequently transmitted to an analyser so that the delay determined by the analyser can be used to correct the delay whilst remaining "in-field" near the football match. In other words, by means of a smartphone or tablet, the audio-video synchronisation measurement can be performed at any (remote) location.

It is considered that the method of the present invention can be performed using, for example, an Apple iPhone. The iPhone may run an "app" that is capable of generating, playing and displaying test audio patterns, test video patterns and data patterns. Advantageously, a cameraman may use his own personal iPhone in an audio-video synchronisation process, thus obviating the need for a dedicated piece of hardware for the process of generating, playing and displaying the audio test pattern or the video test pattern.

In some embodiments, said display comprises a grid of LEDs, and in embodiments, said display is a television monitor.

In some embodiments, the video test pattern includes a data pattern comprising information on one or more of:
   (i) the height or width of the display;
   (ii) the dimensions and/or location of the display with respect to the data pattern; and
   (iii) the relative positions of the monitored regions within the video test pattern.

Advantageously, the data pattern can be used to locate the display or the monitored regions in the video captured by the camera.

According to a second aspect of the invention there is provided a test pattern generator for rolling shutter compensation during signal delay measurement, the test pattern generator configured to:

generate a video test pattern for display on a display, said video test pattern having at least one temporal event;

wherein the temporal event corresponds to a peak, or another part, of a variable of the video test pattern; wherein said variable relates to a colour (for e.g., opacity or intensity) of at least part of the video test pattern;

wherein said colour of at least part of the video test pattern is selected to be on a line L perpendicular to a plane P in 3D colour space, and wherein the colours of the rest of the video test pattern are selected from said plane P, optionally wherein the colour space of the video test pattern is transformed by means of a colour space matrix transform so that two of the axes of the rotated colour space are parallel to plane P and wherein L comprises a third axis of the rotated colour space perpendicular to plane P; and optionally wherein detection of the temporal event comprises detecting the colour of the video along said third axis L.

In a third aspect of the present invention, there is provided a test pattern analyser for rolling shutter compensation during signal delay measurement, the test pattern analyser configured to:

monitor a plurality of regions of a display, in a video captured by a camera;

detect times at which a temporal event of a video test pattern appears in each monitored region of the display in the video;

extrapolate the detected times to calculate the time at which said temporal event would appear at a selected region of the video.

In a fourth aspect of the present invention, there is provided a system for rolling shutter compensation during signal delay measurement, said system comprising:

one or more test pattern generators as described above; and one or more test pattern analysers as described above.

In some embodiments, the system further comprises a rolling shutter camera to capture the video of said display, wherein:

the display on which the test video pattern is displayed has a first update direction;

the rolling shutter camera has a second update direction;

the first update direction is substantially perpendicular to the second update direction; and said plurality of regions are located at different points in the second update direction.

BRIEF DESCRIPTION OF THE DRAWINGS

FIG. 2A illustrates an aligned or synchronised audio-video signal;

FIG. 2B illustrates an audio-video signal wherein the audio signal is delayed in relation to the video signal;

FIG. 2C illustrates an audio-video signal wherein the video signal is delayed in relation to the audio signal;

FIG. 3 illustrates delay correction of offset audio and video signals;

FIG. 5A illustrates a sequence of video test pattern frames with a temporally varying characteristic;

FIG. 5B illustrates an audio test pattern with a temporally varying characteristic;

DETAILED DESCRIPTION

General Audio-Video Synchronisation

Figure 1:
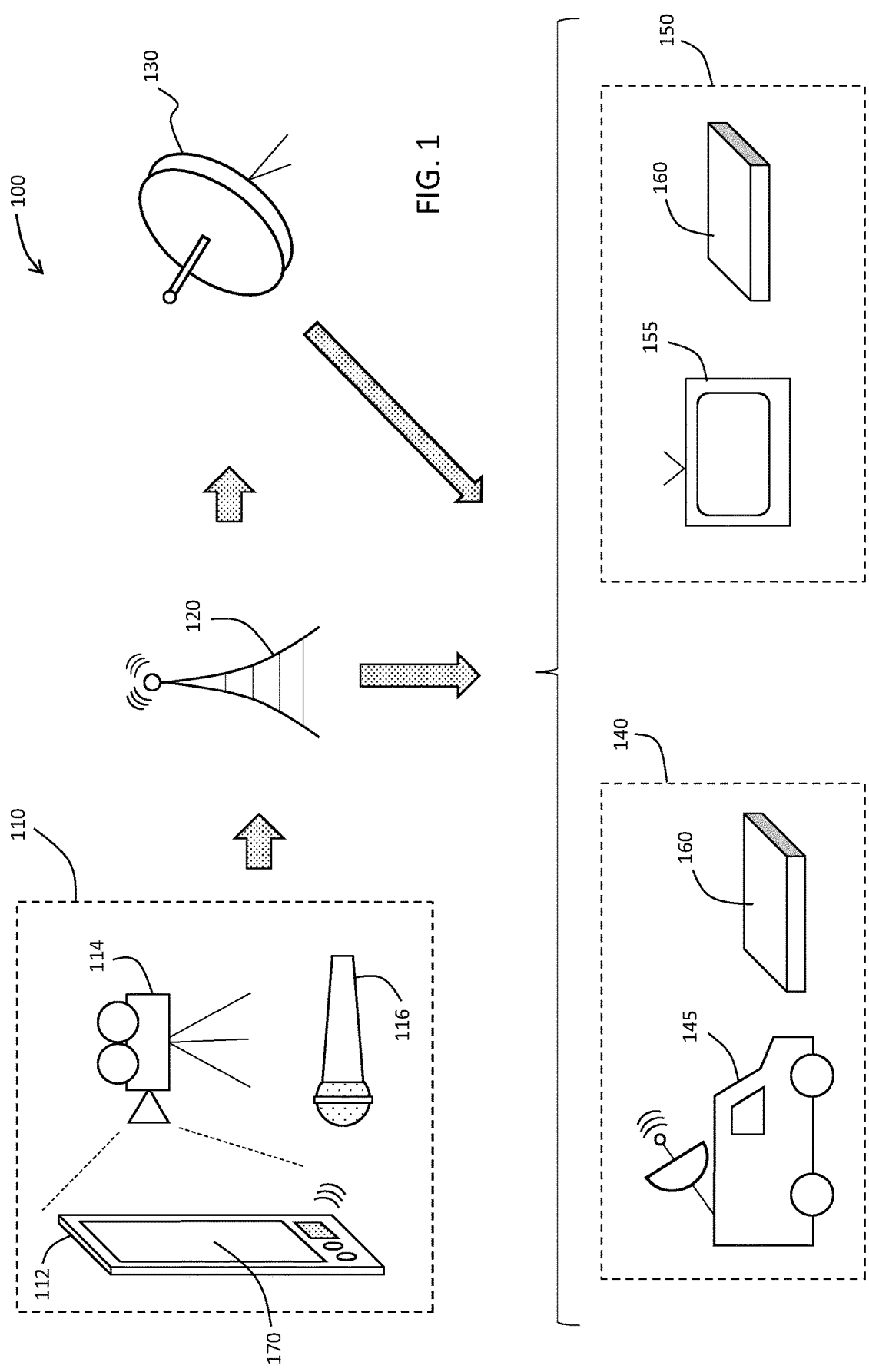
FIG. 1 illustrates a typical broadcasting system including a test pattern generator and an analyser in accordance with aspects of the present invention.

FIG. 1 illustrates a typical broadcasting system 100 that uses embodiments of the present invention. A movie or sports footage may be recorded in a television studio or at a football match, such as at location 110. In particular, a camera, such as camera 114, is used to record a video signal, while a microphone, such as microphone 116, is used to simultaneously record an audio signal. During typical usage, the camera 114 and the microphone 116 may be used to record live video and audio, for example, live footage of a football match. In such applications, it is important that the video and audio signals are time-aligned to ensure, for example, that "lip-sync" errors do not occur.

The video and audio signals from the camera 114 and the microphone 116 are respectively communicated to a broadcasting transmitter, such as for example, broadcasting transmitter 120. The transmitter sends the audio and video signals to receiving entities such as signal receiver 130, outside broadcasting truck system 140 and/or television signal receiver system 150. Thus, the final or intermediate destination of the audio and video signals may be receiving entities such as the outside broadcasting truck system 140 or the television signal receiver system 150.

During transmission of the audio and video signals from the location 110 to the final or intermediate destinations 140, 150, the audio signal and video signals may be subject to a delay. In some circumstances, the audio signal is subject to a different delay to that of the video signal.

In the illustrated implementation, the outside broadcasting truck system 140 comprises an outside broadcasting truck 145 and an analyser 160. The television signal receiver system 150 has a television 155 and another analyser 160. As will be described in greater detail below, the analysers 160 are capable of measuring the delay between received video test patterns and audio test patterns. Analysers may be located at any point in the broadcast network chain, to measure the delay between the received video test pattern and received audio test pattern anywhere in the broadcast chain.

In the above discussion, a single camera and a single microphone are used to capture the video test pattern and the audio test pattern, respectively. In other scenarios, multiple cameras or multiple microphones are used to capture the video test pattern and the audio test pattern, for transmission across different signal paths. The present invention may be used for measuring the delay of signals associated with any number of such cameras or microphones. The present invention may in general be used to measure the delay between a video signal and any other signal.

FIGS. 2A-2C illustrate the video and audio signals under different circumstances. In FIG. 2A, the audio and video signals are subject to no delay, or are both subject to the same delay. In this case, the video signal 200 and the audio signal 210 are illustrated as being aligned in time. In FIG. 2B, the audio signal 230 is shown as being delayed to a greater extent than the video signal 220. In this case, the video signal 220 arrives at the destination earlier than the audio signal 230, and the video signal 220 and the audio signal 230 are illustrated as not being aligned in time. In FIG. 2C, the video signal 240 is shown as being delayed to a greater extent than the audio signal 250. In this case, the audio signal 250 arrives at the destination earlier than the video signal 240, and the video signal 240 and the audio signal 250 are illustrated as not being aligned in time.

In this exemplary embodiment, it is desirable to measure the different timing between an audio signal and an associated video signal. Such a measurement may then be used to correct the delay of one or both of the signals so that the audio signal and the video signal are time-aligned.

FIG. 3 illustrates a prior art delay correction system. A video signal and an audio signal are recorded in a studio or at a football match, such as at location 110, and by means of camera 114 and microphone 116. The video signal 300 and the audio signal 310 as shown in FIG. 3 correspond to the signals as recorded at location 110; at this stage, the signals are time-aligned and synchronised. The video and audio signals are then transmitted over a broadcast network. During this transmission, the audio and video signals are respectively subject to different delays and so arrive at a final or intermediate destination without being time-aligned; that is, they are not synchronised. This is shown in FIG. 3 in which the received video signal 320 and the received audio signal 330 are subject to different delays and are not time-aligned.

At step 340, the delay between the video signal and the audio signal is measured. At step 350, the measured delay is used to correct the timing of the respective signals in order to remove the effects of differing delay in the signals. The system outputs video signal 360 and audio signal 370, wherein video signal 360 and audio signal 370 are time-aligned.

It is to be noted that the present scheme is concerned with the measurement of the delay of a video signal, such as a delay between an audio signal and a video signal, and not with the correction of any measured delay.

Figure 4A:
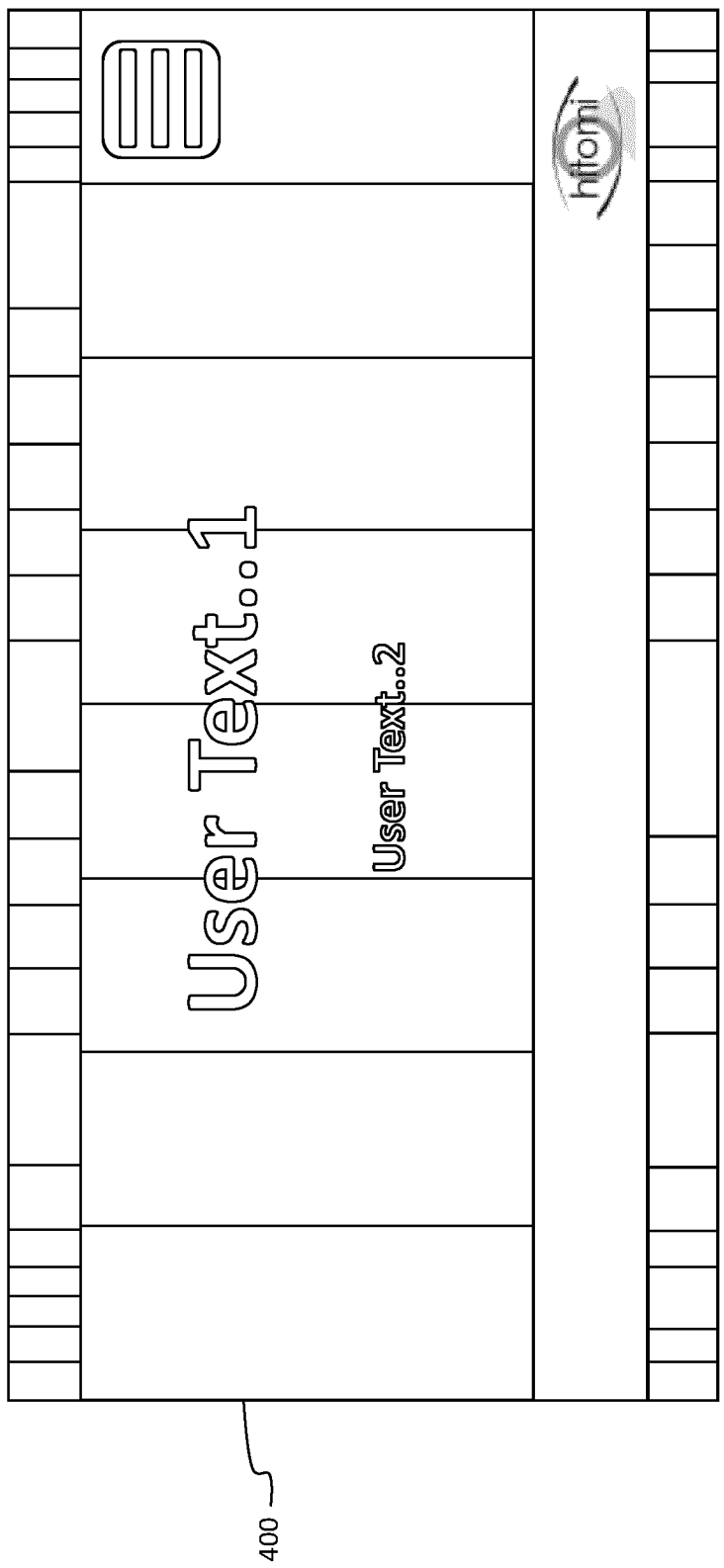
FIG. 4A shows an example of a video test pattern.
Figure 4B:
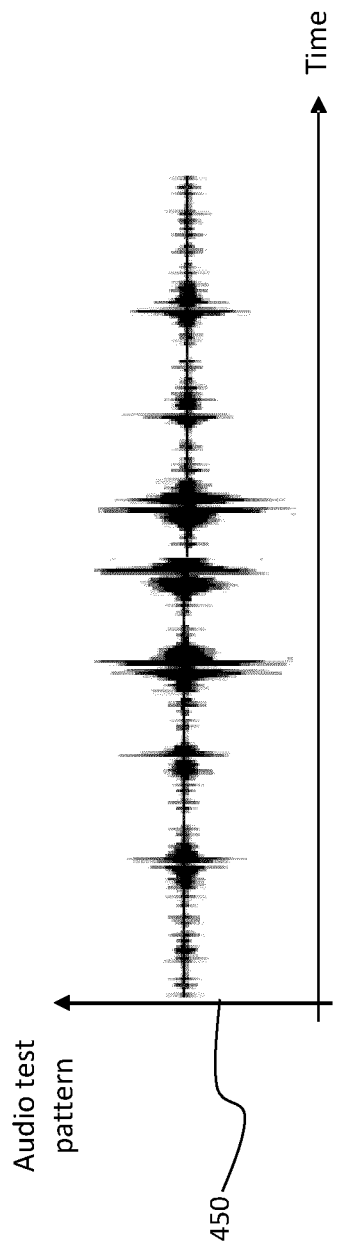
FIG. 4B shows an example of an audio test pattern.

One way to measure the delay between an audio signal and an associated video signal is by means of video and audio test patterns. FIG. 4A shows a typical video test pattern 400 and FIG. 4B shows a typical audio test pattern 450. In particular, during a synchronising phase prior to broadcast, instead of sending the actual signals of interest (e.g. footage of a football match) through the signal chain, the audio and video test patterns 450, 400 are sent through the signal chain instead.

The audio test pattern 450 has temporal characteristics that are matched in some way to temporal characteristics of the video test pattern 400. For example, the audio test pattern 450 may comprise a pulse that is to occur at the same time as a pulse in the video test pattern 400. By using knowledge of the temporal characteristics of the audio and video test patterns 450, 400, an analyser receiving the broadcast test patterns can ascertain the delay between the audio test pattern 450 and the video test pattern 400. Such an analyser is illustrated in FIG. 1 as analyser 160.

For example, the video test pattern 400 may comprise a "flash" that is designed to occur at the same time as an accompanying audible click or a beep in the corresponding audio test pattern 450. The analyser 160 receives the video test pattern 400 and the audio test pattern 450 after the patterns have been transmitted through a processing chain of a broadcasting system 100. By determining the delay between the flash in the received video test pattern 400 and the audible click or beep in the received audio test pattern 450, the analyser 160 can determine the delay between the received audio and video test patterns 450, 400.

A test pattern generator 170 (see FIG. 1) may be used to generate the video test pattern 400 and the audio test pattern 450. The audio and video test patterns are played by a device; the screen of the device and the speaker of the device is then captured by a camera or microphone for transmission over the broadcast network. In a preferred embodiment, the test pattern generator 170 is a multi-purpose computing device such as smartphone 112 and the video test pattern 400 is displayed on the screen of smartphone 112. In the preferred embodiment, the audio test pattern 450 is played by the smartphone 112 at the same time as the video test pattern 400 is displayed by the smartphone 112.

Example Temporally Matched

FIGS. 5A and 5B illustrate examples of a video test pattern 500 and an audio test pattern 550. A preliminary video test pattern 500' comprises a number of consecutive frames 512', each frame comprising an image such as a bitmap.

In this example, a digitized sinusoidal pulse is overlaid on the preliminary video test pattern 500' to produce the video test pattern 500. As shown in FIG. 5A, frames 235, 236, 4 and 5 of the preliminary video test pattern 500' are unchanged in the video test pattern 500. However, frames 237, 238, 239, 0, 1, 2 and 3 of the video test pattern 500 are different to the respective frames in video test pattern 500'.

In the present example, the frames of video test pattern 500 are different to the respective frames of preliminary video test pattern 500' in that the frames 237, 238, 239, 0, 1, 2 and 3 of video test pattern 500 have a uniform colour overlaid on the image contained in the respective frame. The opacity of the overlaid colour differs from frame to frame. In this example, the opacity of the overlaid colour is zero in frames 235, 236, 4 and 5 (that is, no colour is overlaid on these frames). The opacity of frames 237 and 3 are of a certain level, referred to as level 1. The opacity of frames 238 and 2 are of another level, referred to as level 2. The opacity of frames 239 and 1 are of a still other level, referred to as level 3. The opacity of frame 0 is at the highest level, referred to as level 4. Levels 1-4 correspond to progressively increasing levels of opacity.

In other words, in this example, some of the consecutive frames of the preliminary video test pattern 500' are overlaid with a colour that becomes progressively more opaque from frame to consecutive frame, and then progressively less opaque from frame to consecutive frame. The result is video test pattern 500.

In other embodiments, some consecutive frames of the first and second sets of consecutive frames may have the same opacity. In still other embodiments, other temporal patterns may be overlaid on the preliminary video test pattern 500' to produce the video test pattern 500. For example, polynomial curves may be used as an alternative to sinusoidal curves.

Continuing with the present embodiment, an audio test pattern 550 for use with the video test pattern 500 is shown in FIG. 5B. In this embodiment, the audio test pattern 550 comprises a flat signal that rises, peaks and falls at times corresponding to the rising and falling opacity of the video test pattern 500.

In this example, the audio test pattern starts to rise at the same time as frame 237 of the video test pattern 500, wherein frame 237 is the first frame in the illustrated sequence of frames to have a non-zero opacity of the overlaid colour. The audio test pattern continues to rise for the duration of frames 238 and 239 of the video test pattern 500, wherein frames 238 and 239 have increasing opacities of the overlaid colour. The audio test pattern then peaks at frame 0 of the video test pattern, wherein frame 0 has the highest opacity of the overlaid colour. The audio test pattern then falls for the duration of frames 1, 2 and 3 wherein frames 1, 2 and 3 have decreasing opacities of the overlaid colour. The remaining frames of the video test pattern starting from frame 4 onwards have no overlaid colour, until frame 237 repeats as shown in FIG. 5A; the audio test pattern also varies accordingly as shown in FIG. 5B.

In other words, in this example, the temporally matched features of the audio test pattern and the video test pattern respectively comprise a rising and falling audio signal and a video signal overlaid with frames of rising and falling colour opacity. When there is no relative delay between the audio and video signals, the audio signal and the video signal varying in this way peak at the same time. Any time delay between, for example, the peak of the video signal (frame 0) and the peak 552 of the audio signal can be used to determine the delay between the video signal and the audio signal. In other embodiments, other points in the audio signal and video signal can be used to determine this delay.

Figure 6:
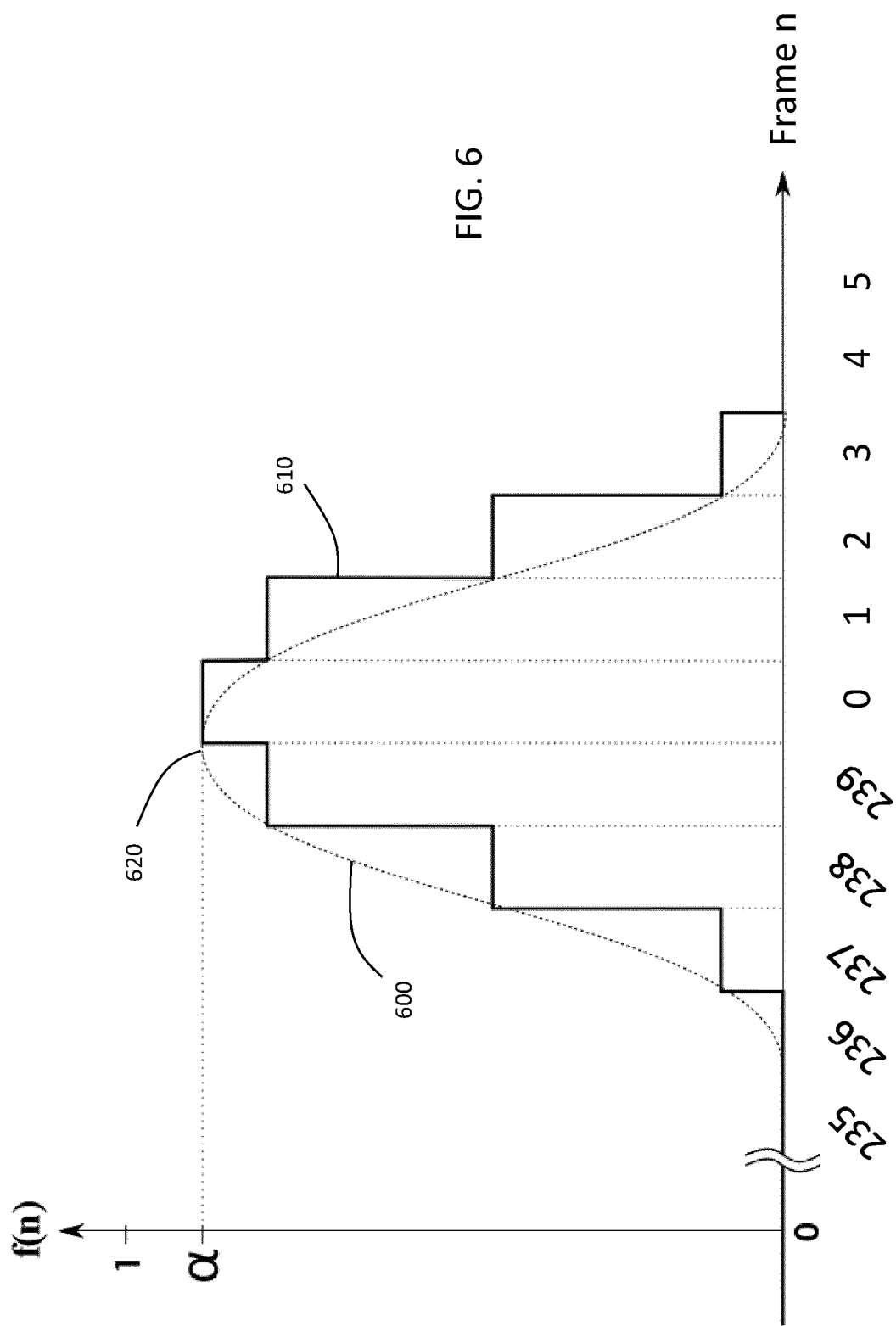
FIG. 6 is a graph showing an example of quantization of the video test pattern characteristic shown in FIG. 5A.

FIG. 6 shows an example of how the opacities of the colours overlaying the frames 235-239 and 0-5 of the video test pattern 500 varies over time and from frame to frame. The opacities vary sinusoidally. However, as the video frames are discrete, the opacities are quantized versions 610 of an analogue sinusoidal function 600. Discrete opacities are required, for example, where the video test pattern generator is a digital device such as a tablet or a smartphone.

As shown in the horizontal axis of FIG. 6, frames 235 and 236 have no colour overlaid on them. Frames 237-239 are overlaid with a colour of increasing opacity, the opacity varying sinusoidally. The sinusoidal function peaks 620 at frame 0 and it is this frame that is overlaid with the most opaque colour. The peak is shown as α on the y-axis. The frames 1-3 are overlaid with a colour of decreasing opacity, the opacity varying sinusoidally. Frames 4 and 5 have no colour overlaid on them.

In the case where the opacities vary sinusoidally, the function shown in FIG. 6 may be described as:

$$f(t) = \begin{cases} \alpha \frac{1}{2}(\cos\omega.t + 1), & -\frac{\pi}{\omega} > t > \frac{\pi}{\omega} \\ 0, & t \leq -\frac{\pi}{\omega} \\ 0, & t \geq \frac{\pi}{\omega} \end{cases} \quad \text{Equation [1]}$$

where $0 < \alpha \leq 1$

Note that ω is chosen to meet sampling criteria of the capturing camera, whilst considering the frame rate of the displaying device. Also, α is the peak level and may be set to avoid clipping of the display device.

In other embodiments, the opacity of the colour overlaid on the preliminary video test pattern 500' to generate the video test pattern 500 may not vary sinusoidally, but may vary according to some other temporal function, for example a polynomial function. In still other embodiments, the video test pattern 500 may vary in some other respect than colour opacity (for example, some other artefact can be caused to appear in the video at the same time as an artefact in, for example, an audio test pattern). For example, instead of modulating the opacity, the brightness of the screen could be modulated, or the hue of the image could be modulated. The varying video and audio test patterns 400, 450, however, are constrained in that temporal features of the video test pattern 400 need to be easily matched with temporal features of the corresponding audio test pattern 450, so that any delay between the audio and video signals can be easily determined.

In other embodiments, instead of using a pulse as described above the screen or display is faded from the preliminary video test pattern 500' to a uniform colour a few display frames before the timing pulse and then fades back to the preliminary video test pattern 500' a few frames after the flash.

Sampling Rate

In order to detect an event such as a pulse peak in the video test pattern, the camera must capture the video test pattern at a minimum frequency. Captured video is a 3-dimensional sampling system with spatial (horizontal and vertical) and temporal axes. According to the sampling theorem if the originating continuous time signal contains frequencies above the Nyquist frequency aliasing will cause the original signal to be unrecoverable. When considering sampling a video comprising a marker or an event in continuous time, such as the peak of a sinusoidally varying opacity described above, the same restriction is true.

Thus in order to recover the absolute time that a detectable event in a video test pattern occurred after it has been sampled by a camera, the signal comprising that event (be it a flash of light, screen flashing, dimming, changing colour or the pulse peak described above) should not contain frequencies beyond the Nyquist frequency. The temporal sampling rate of video is the frame or field rate, which is often 24, 50, 59.94 or 60 Hz, or higher. Thus, if the sample rate is 50 Hz, the Nyquist frequency is $f_{Nyquist}=fs/2=25$ Hz, and the signal comprising the event to be detected must not contain frequencies higher than this frequency.

Detection of Shaped Pulse

Figure 7:
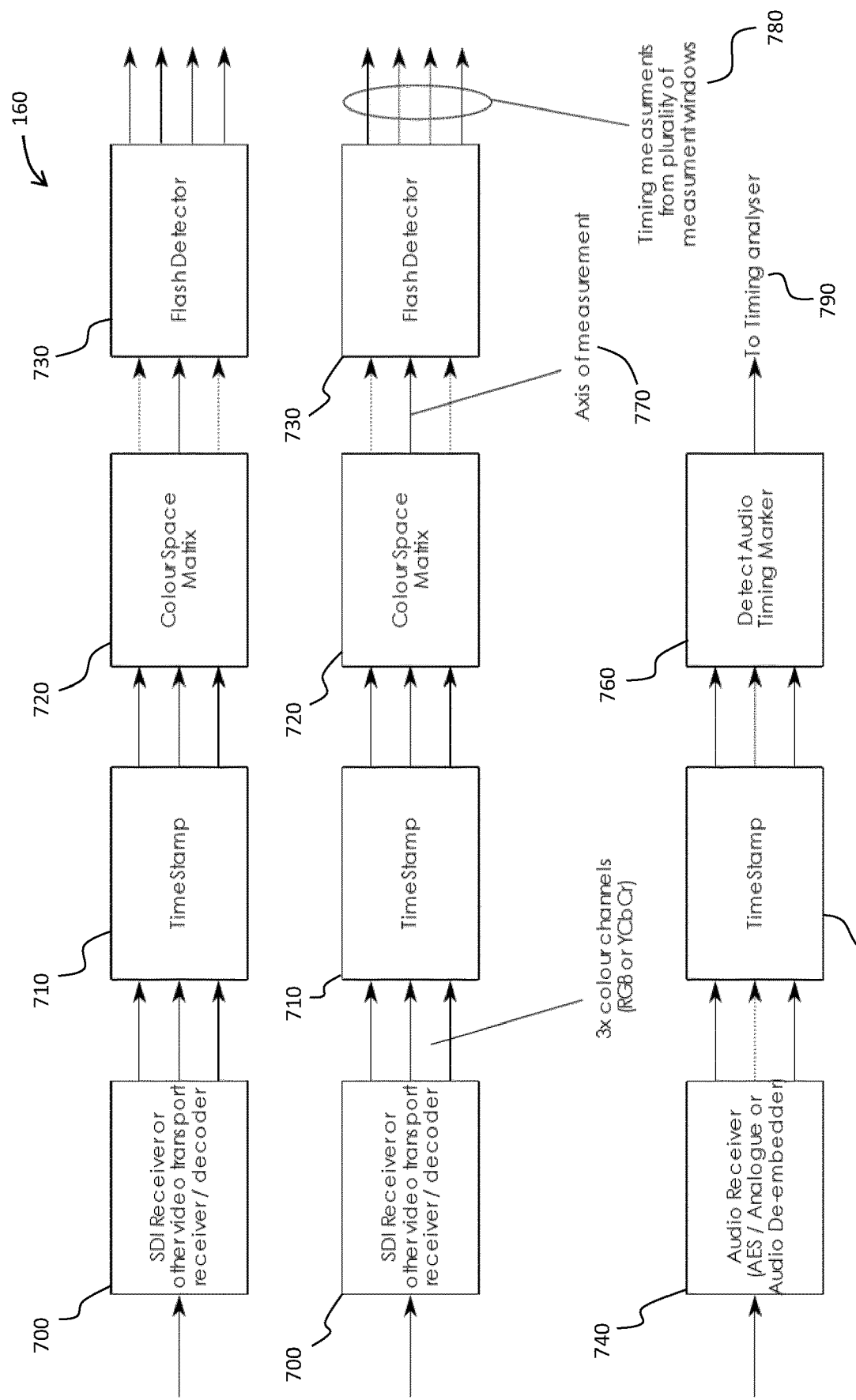
FIG. 7 shows various functional components of the test pattern analyser.

FIG. 7 shows the analysing device 160 receiving a stream of video data at block 700 and a stream of audio data at block

740. The video data may be received, in one embodiment, over an SDI (Serial Digital Interface). In other embodiments, the video data may be received over an IP (Internet Protocol) stream. Other means of sending video are possible, and the video may be compressed or comprise raw sample data. The video data may also be written into storage (e.g. a VT or a video server), and played out again.

FIG. 7 shows three signals entering the system analysing device 160. The number of channels is chosen arbitrarily. One or more video channels may be received, each video channel requiring timing measurements between them. One or more audio channels may be received, and the timing of the signals on these channels may be compared against the timing of signals on the video channel. In overlapping embodiments, any signal which must be co-timed with the video can be received by the analysing device 160.

Once received, a video signal is represented by the analyser as three channels, each representing the coordinates, in 3D space, of colours representable by the television system. These channels may correspond to Red, Green and Blue (RGB) channels. Alternatively, the channels may relate to luminance and two chrominance channels Y, Cb and Cr (or possibly any other three channels chosen to represent a colour).

The arrival time into the system is logged in the timestamp blocks 710 shown in FIG. 7. These time stamp blocks could comprise any arbitrary timing mechanism, provided that the timer is common to all received channels or derive from a common timing source so that measurements between stamped received data can be meaningfully compared. The timing source could be a local clock or an external timing source such as GPS (Global Positioning System), NTP (Network Time Protocol), PTP (Precision Time Protocol), LTC (Linear Time Code), VITC (Vertical Interval Time Code) or any other source of time.

The video frames, once time of arrival has been determined, are delivered to a flash detector system 730, optionally via a manipulation of the colour space, shown as the 'Colour Space Matrix' block 720. Flash (or pulse) detection and colour space manipulation are described in greater detail later in this document.

The audio signals may be received at block 740 and may be passed to a timestamp block 750, similar to the timestamp blocks 710 that receive the video signals. A timing marker in the audio signal, such as a sinusoidal wave with a peak, is detected at block 760 and sent to a timing analyser, so that the delay between the video signal and the audio signal can be determined.

Adverse Effect of Rolling Shutter

Figure 8B:
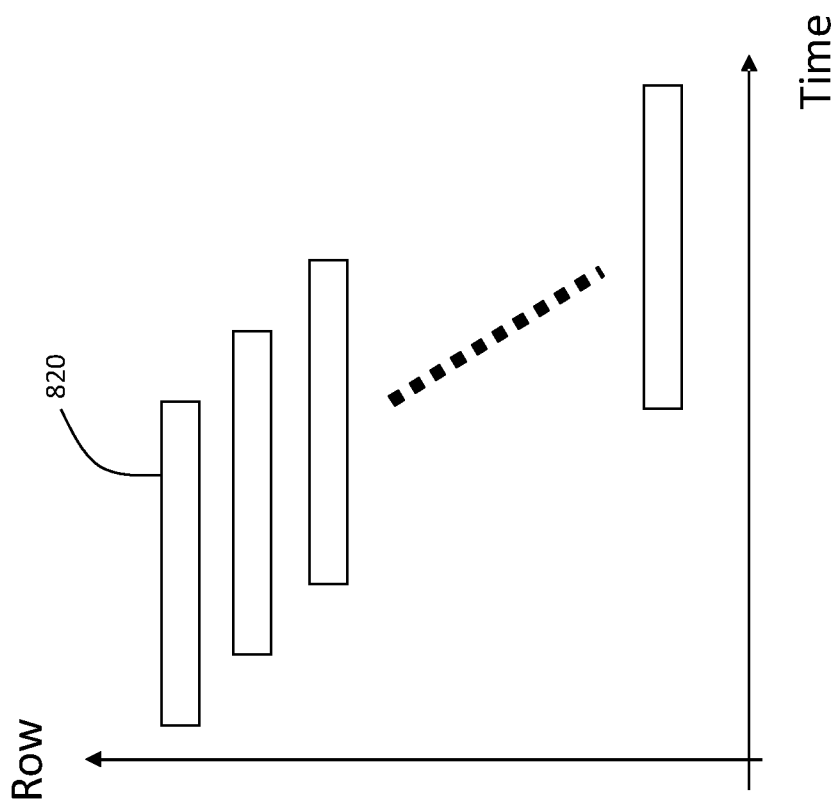
FIG. 8B shows row capture using a rolling shutter mechanism.
Figure 8A:
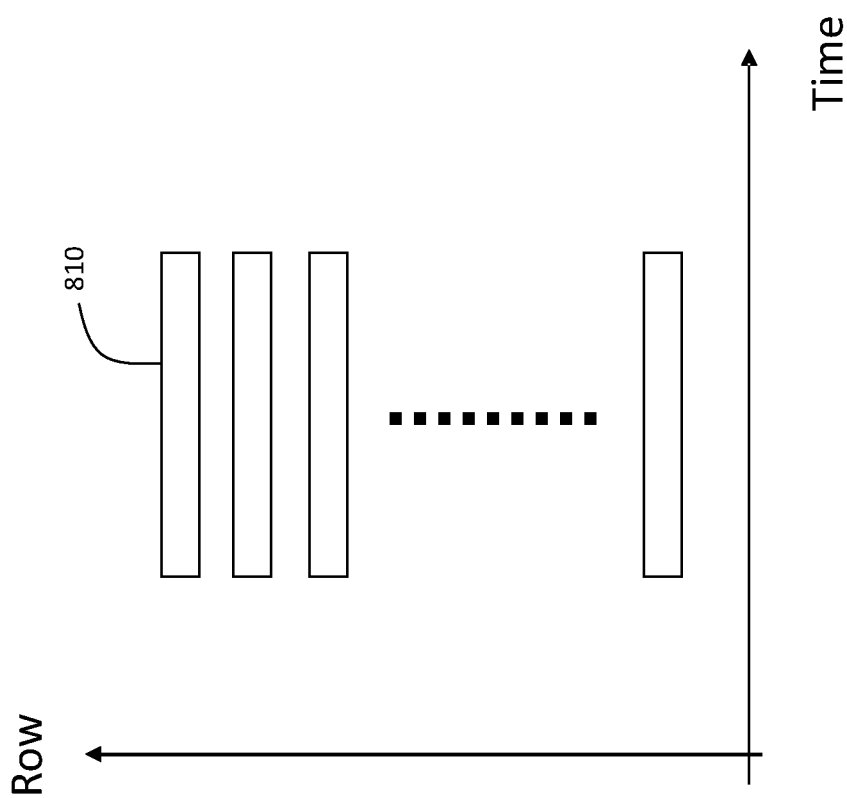
FIG. 8A shows row capture using a global shutter mechanism.

FIGS. 8A and 8B show the difference between how image rows are captured in a global shutter camera and in a rolling shutter camera, as discussed above in the background section. FIG. 8A shows row capture in a global shutter context and FIG. 8B shows row capture in a rolling shutter context. In global shutter mechanisms, all of the rows are captured in a single act. Thus, FIG. 8A shows all the rows being captured in the same space of time. In rolling shutter mechanisms, the rows are captured sequentially. Thus, FIG. 8B shows that the rows are captured at different points in time, and the first row of a frame is captured earlier than the last row of a frame. In other implementations, the individual pixels are captured sequentially. In such implementations, the first pixel of a frame is captured earlier than the last pixel of a frame. In the case of 50 Hz television there may be up to 20 ms difference in time between the first and last captured pixels.

In measuring the delay between an audio test pattern and a video test pattern, the timing of the audio test pattern with respect to the video test pattern is of central importance. However, in a camera using a rolling shutter mechanism, the more complex timing of the row capture or pixel capture introduces complexities in the mechanism measuring the delay between the video test pattern and the audio test pattern. The same applies when measuring the delay between the video test pattern signal and any other signal.

In a situation where a scanning display device showing the video test pattern is in the field of view of a camera, depending on the instant in time that the shutter of the camera is open the displaying device will be at a varying phase of update. Smartphone and tablet screens that can be used to display the video test pattern typically update their pixels sequentially line by line much like the rolling shutter of a camera through the course of one display frame. The update rate is typically 60 Hz, though update rates are subject to change.

Figure 9A:
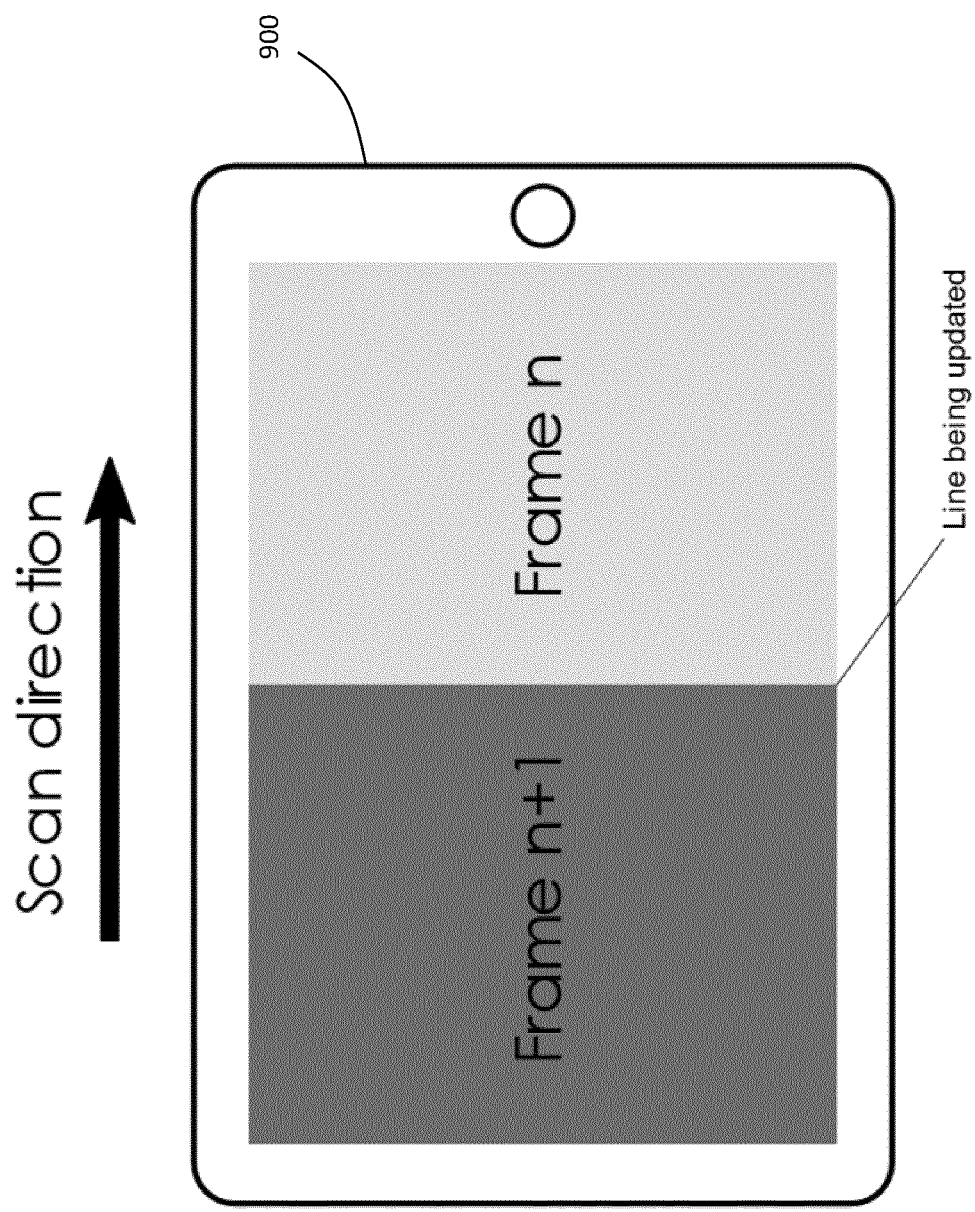
FIG. 9A shows the screen of a smartphone with a partially updated frame.

FIG. 9A shows a smartphone screen 900 updating, with the image lines in the vertical orientation, scanning from left to right part way through a frame update. In FIG. 9A, the left half of the screen or display has already been updated and the right half of the screen or display is still showing the previous frame.

Figure 9B:
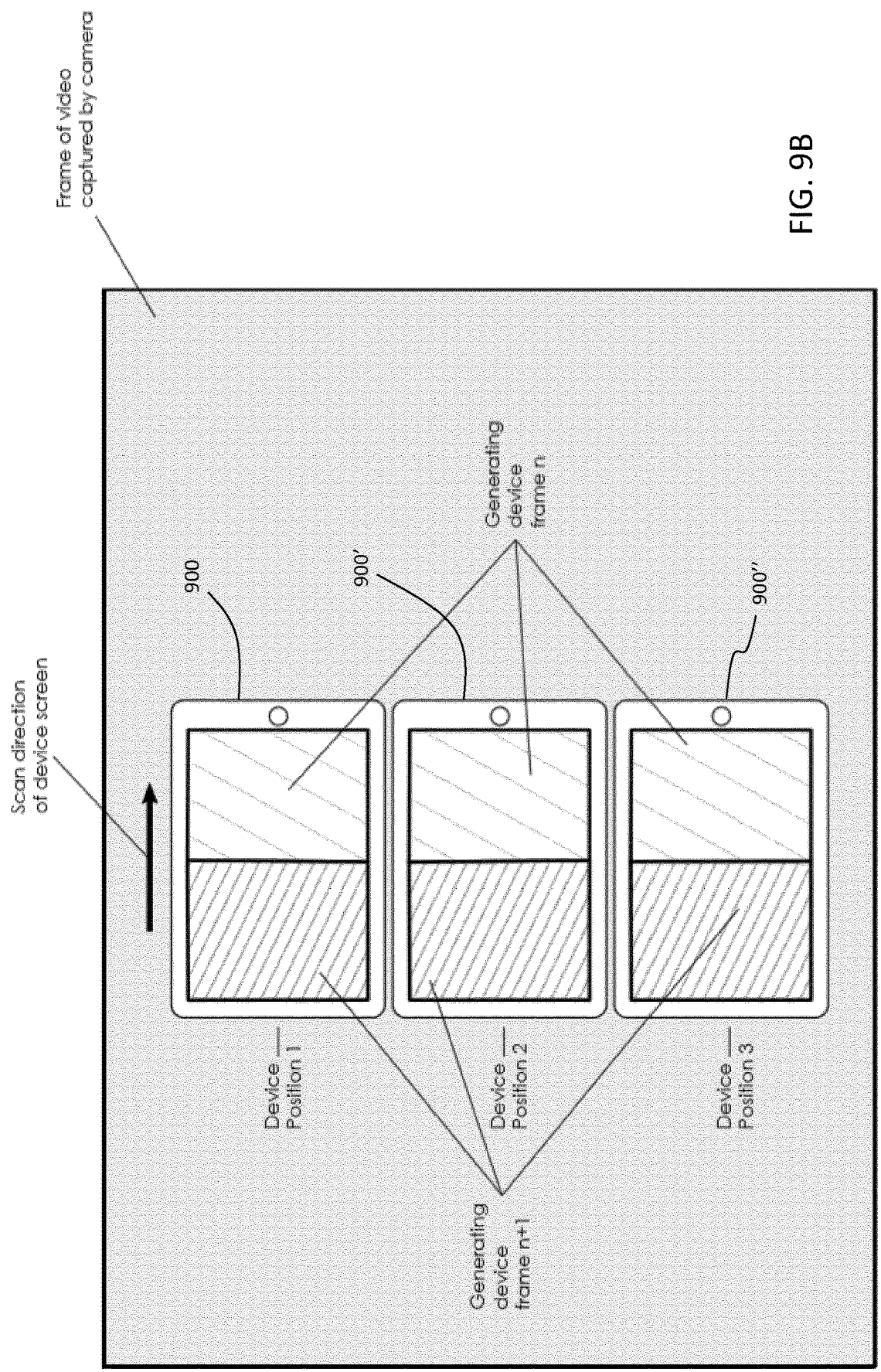
FIG. 9B shows a smartphone in three different positions in the camera field of view, where the camera is using a global shutter mechanism.

FIG. 9B shows an example of the field of view of a camera capturing a video test pattern being displayed on the screen of a smartphone 900. In the example of FIG. 9B, the camera is using a global shutter mechanism. The same smartphone, for e.g. showing the video test pattern, is shown in three different positions in the field of view of the camera. In the first position, the smartphone, here labelled with reference numeral 900, is in the top half of the field of view of the camera. In the second position the smartphone, here labelled with reference numeral 900', is in the centre of the field of view of the camera. In the third position the smartphone, here labelled with the reference numeral 900", is in the bottom half of the field of view of the camera.

In the example of FIG. 9B, because the smartphone is captured in the three positions using a global shutter mechanism, there is no adverse effect on how the video test pattern shown on the smartphone is captured.

As global shutter cameras sample all the pixels from one frame or field at a single instant in time, when those samples are mapped onto an orthogonal spatiotemporal grid there is no apparent difference to the apparent time of the event with respect to the location of that event in space.

Presuming a perfect instantaneous global shutter, and given that display frame n and display frame n+1 shown in FIG. 9A, are flat fields of uniform but different colour; by summing all pixels in a band across the captured screen area in the direction of scan, the integrated value will change approximately linearly between the same band captured when the display is showing all of frame n and all of frame n+1 depending on the relative phase of the device (smartphone) screen scan and the shutter time of the camera. This allows detection of the phase of the display device or smartphone as an almost continuous function. This gives potential to determine the phase of the device or smartphone display to a far greater resolution than the frame period of the displaying device.

Figure 9C:
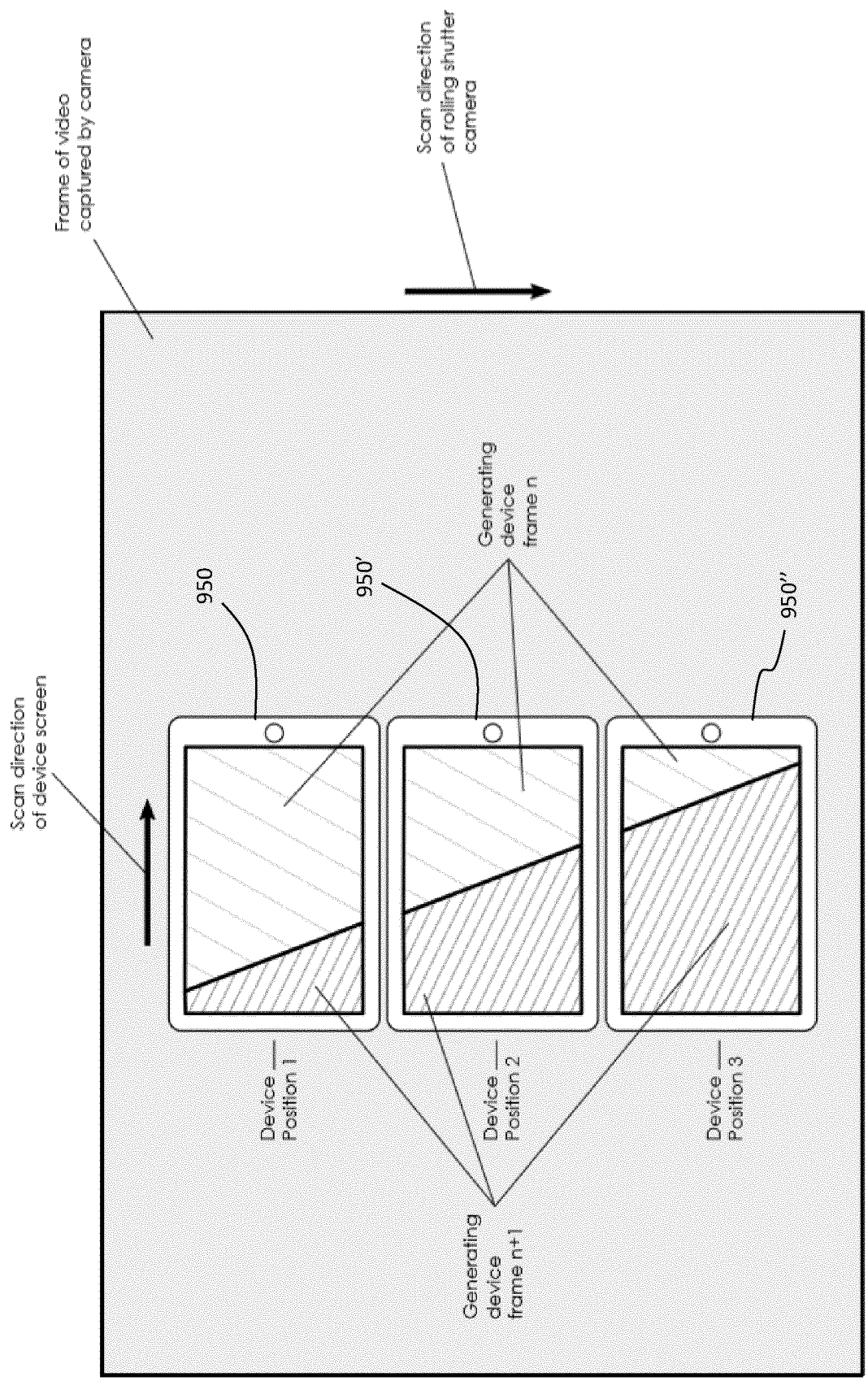
FIG. 9C shows a smartphone in three different positions in the camera field of view, where the camera is using a rolling shutter mechanism.

FIG. 9C shows an example of the field of view of a camera capturing a video test pattern being displayed on the screen of a smartphone 950. In the example of FIG. 9C, the camera is using a rolling shutter mechanism.

If we map all samples (or pixels) within the same frame onto an orthogonal spatiotemporal grid with all samples in a frame considered to represent an instant in time, if the device generating the timing marker or pulse is captured toward the top of the field of view, the captured signal will appear later in time in the sampled domain compared to if it were toward the bottom.

In FIG. 9C, the same smartphone is shown in three different positions in the field of view of the camera. In the first position, the smartphone, here labelled with reference numeral 950, is in the top half of the field of view of the camera. In the second position the smartphone, here labelled with reference numeral 950', is in the centre of the field of view of the camera. In the third position the smartphone, here labelled with the reference numeral 950", is in the bottom half of the field of view of the camera.

In the example of FIG. 9C, because the smartphone is captured in the three positions using a rolling shutter mechanism, temporal effects can be seen when capturing the video test pattern shown on the smartphone 950. In particular, (i) the rows and pixels of the video test pattern are not captured at the same moment and (ii) the test video pattern captured in the three positions 950, 950' and 950" are different.

For example, when the rolling shutter mechanism is scanning the top edge of the smartphone, the smartphone will be in a first state of update. When the rolling shutter mechanism is scanning the bottom edge of the smartphone, the smartphone will be in a second state of update, later than the first state of update. When the rolling shutter mechanism is scanning any part of the smartphone between the top edge and the bottom edge, the smartphone will be in an intermediate state of update between the first state and second state. This is represented in smartphones 950, 950' and 950" as a sloping vertical line demarcating a current frame as it is updated by a new frame.

The above timing effects caused by the rolling shutter mechanism capturing the test video pattern shown on the smartphone affects the measurement of the timing of the test video pattern, thus affecting the measurement of delay between the test video pattern and another signal, such as a test audio pattern.

Detection Regions

Considering a camera with a rolling shutter filming the display device with the scan directions of the camera and display device perpendicular to each other, the instantaneous phase relationship between the camera and display device may be determined at individual points through the scan of the camera by choosing regions of the captured device screen or display over which to integrate.

This characteristic remains the same irrespective of the direction of scan of displaying device provided that the scans are perpendicular to each other.

Figure 10:
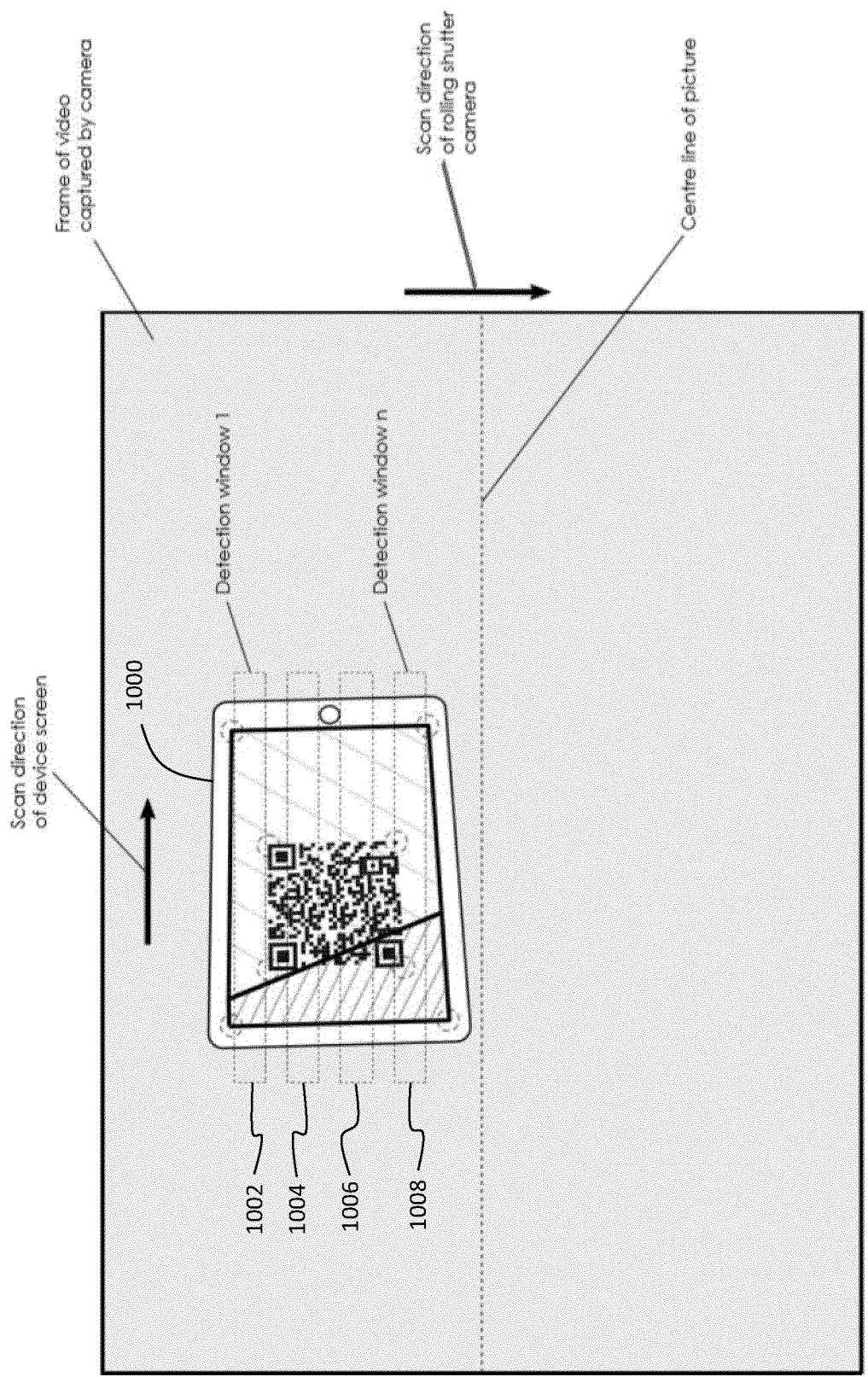
FIG. 10 shows a smartphone in a camera field of view, the smartphone image divided into a number of regions.

Thus, the present solution to the effects of the rolling shutter mechanism as described above comprises dividing the image of the smartphone, as it appears in the field of view of the camera, into a plurality of detection regions or windows, as illustrated in FIG. 10. This may be performed by the Flash Detector block 730 illustrated in FIG. 7. The regions are chosen by finding the smartphone spatially in the incoming video and selecting regions at the top and bottom of the smartphone screen. Each detection region of the smartphone image is monitored separately by the analyser 160.

In some embodiments, the smartphone screen and the detection regions are found within the incoming video by means of a data pattern in the video test pattern showing on the smartphone screen. The data pattern may, for example, comprise a two-dimensional code matrix, such as a QR code, that encodes one or more of (i) the height or width of the smartphone screen, (ii) the dimensions and location of the smartphone screen with respect to the QR code, or (iii) the relative position of the detection regions within the video test pattern. Other types of code matrix, matrix barcodes or two-dimensional bar codes may be used.

In the embodiment of FIG. 10, four detection regions 1002, 1004, 1006 and 1008 are used. In this embodiment, each detection region is rectangular and extends from one side of the smartphone to the other. The height of each detection region is approximately a quarter of the height of the smartphone and the detection regions are stacked on top of each other. In this embodiment, the regions are equally spaced from each other between the top and bottom of the smartphone screen.

Many ways could be conceived of dividing the smartphone image into regions or windows. For example, the whole incoming picture could be sliced into horizontal bands or bands at fixed or variable spacing vertically through the video frame.

In other embodiments, fewer detection regions may be used. However, at least two detection regions are needed for the present method. In still other embodiments, more than four detection regions may be used. For example, 8 or 16 detection regions may be used. In overlapping embodiments, the shape of the detection regions may be other than a rectangular shape. For example, the shape of the detection region may be elliptical.

Pulse Peak Detection

Returning to the embodiment of FIG. 10, whilst the analyser is monitoring, in parallel, the four detection regions 1002, 1004, 1006 and 1008 of the smartphone, a sinusoidal pulse of a single colour is flashed across the screen of the smartphone. For example, this sinusoidal pulse may correspond to that of FIGS. 5A, and 6 as described above.

Figure 11:
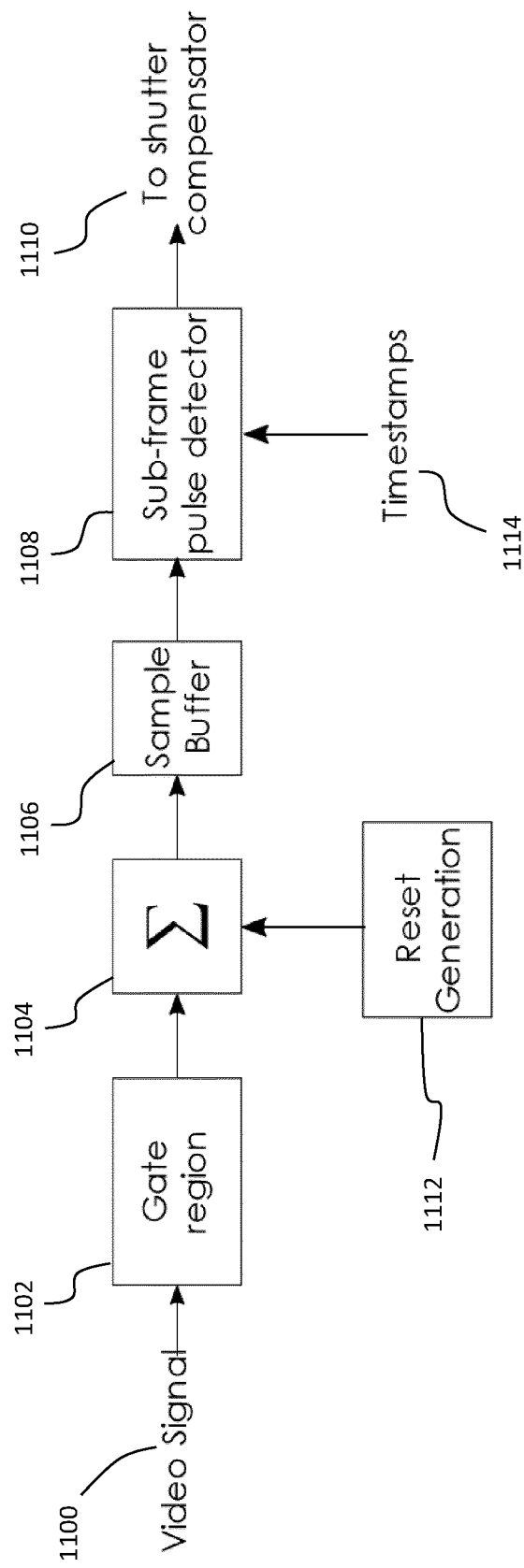
FIG. 11 shows a pulse detector system used by the analyser.

The system illustrated in FIG. 11 detects the sinusoidal pulse as it appears in each detection region.

First, the signal is gated, for example by gate region module 1102, such that only samples within a particular region are outputted to the summation module 1104. The samples outside the region are set to zero. The gating could also be achieved by passing an enable signal to the summation module to disable it for samples outside the region. At summation module 1104, the values of all samples in the region are summed to give a single value for that region for each video frame. Once all input values within the region have been summed, the accumulated value is captured and recorded in the sample buffer 1106. Then, the accumulator is reset for processing of the next frame; the reset mechanism may be triggered, for example, by reset generation block 1112.

The sample buffer block 1106 captures the accumulated regions for each incoming frame in a buffer addressed by incoming frame number and contains 256 samples, so at 50 Hz frame rate this captures just over 5 seconds of samples. Software can then read that data and perform the subframe pulse detection.

The sub-frame pulse detector 1108 receives the output of the sample buffer block 1106. This output may correspond, for example, to the pulses illustrated in FIGS. 5A, and 6. In some embodiments, the timing pulse appears to the sub-frame pulse detector 1108 as a negative going pulse of unknown magnitude and DC offset. The detector 1108 continuously scans the sample buffer 1106 looking for pulse detections.

The first stage of this scanning is to roughly detect timing pulse locations. The pulse detector 1108 calculates the mean and standard deviation of data stored in the sample buffer 1106, and triggers on samples in the buffer which are, in the example of the negative going pulse, below the mean by the standard deviation multiplied by a constant. The constant is suitably selected to avoid excessive false triggering.

Once a detection is triggered, the sub-frame pulse detector 1108 uses interpolation of the pulse in order to find its centre. The true centre of the pulse is found in the described system by (i) setting a threshold half way between the determined minimum of the pulse and the mean level of the signal before and after the pulse, (ii) using interpolation to find the falling and rising edge times where the pulse crosses that threshold, and (iii) calculating the average of the two times to derive the pulse centre.

There are many ways the true centre of the pulse or the sub frame location of a video timing pulse could be determined (for example, peak detection by any number of interpolation types, correlation in time or frequency domain, etc.).

The output of the sub-frame pulse detector 1108 is the time that the event occurred relative to the time of the video frames recorded by the timestamp block 710. In the preferred design this is a floating-point frame number, considering each frame to have an integer number assigned to it. This time could however be a time relative to an external clock which could be locked to GPS (Global Positioning System), NTP (Network Time Protocol), PTP (Precision Time Protocol), LTC, VITC or any other time reference source.

The above steps carried out by the gate region module 1102, summation module 1104, sample buffer 1106, sub-frame pulse detector 1108 and reset generation block 1112 are carried out for each monitored region of the smartphone display, such as regions 1002, 1004, 1006 and 1008 as shown in FIG. 10. This results in the detection of the pulse peak as it appears in each monitored region.

Rolling Shutter Compensation

A requirement of the presently discussed examples of FIGS. 2A-12B is that the rolling shutter mechanism is scanning in a direction perpendicular to the scanning direction of the smartphone screen.

Figure 12A:
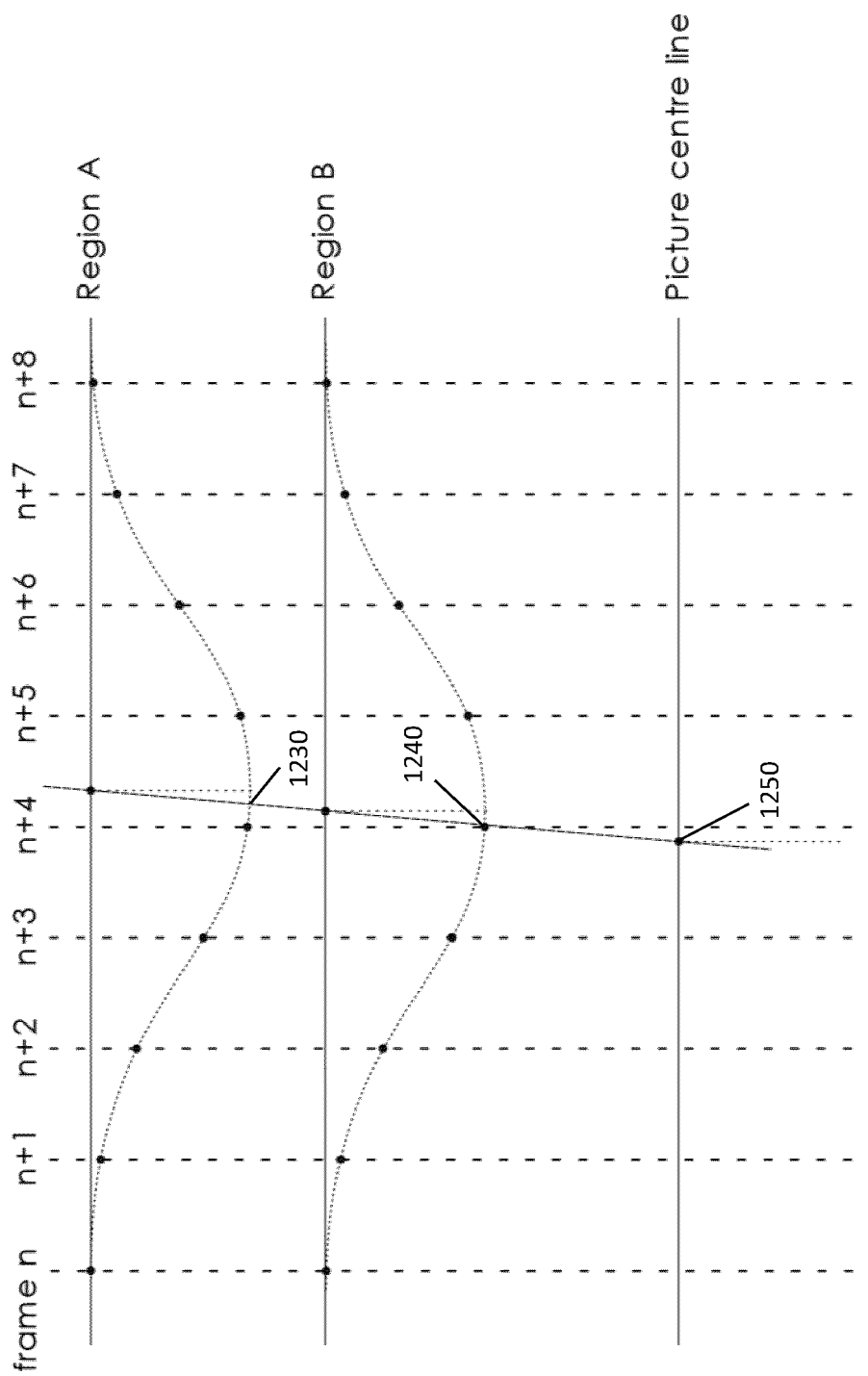
FIG. 12A shows an example of different pulses corresponding to different regions of the video test pattern monitored by the analyser.

As described above, due to the nature of the rolling shutter mechanism, the analyser receives the sinusoidal pulse in each detection region at different sequential points. For example, FIG. 12A shows the different times at which the sinusoidal pulse appears in each detection region of the smartphone when received by the analyser 160. The sinusoidal pulses are detected at different points because the rolling shutter captures pixels or rows of a single frame at different points in time.

After displaying the sinusoidal pulse of colour on the smartphone, the peak of the pulse as it appears in each detection region is determined. These correspond to peaks 1230 and 1240 as shown in FIG. 12A. In Region A of FIG. 12A, the pulse peaks at point 1230, which is earlier than the pulse peak 1240 of Region B of FIG. 12A. Region A may correspond to detection region 1002 of FIG. 10 and Region B may correspond to detection region 1004 of FIG. 10.

The peak of the pulse is to be used as a temporal event for measuring the delay between the video signal and another signal. However, in the case of a rolling shutter camera capturing a screen or display showing the pulse, this peak occurs at different times in the monitored smartphone screen, as shown by exemplary pulse peaks 1230 and 1240.

Further, the times at which the peaks appear in the regions shown in FIG. 12A changes in dependence on the vertical location of the smartphone within the field of view of the camera. This is because moving the smartphone vertically in the camera field of view will change the time at which the pulse peak appears in Region A or Region B.

However, the actual moment in time at which the peak occurred is not readily available from this plurality of observed peak times 1230 and 1240, and it is not readily apparent which of these times should be used in, for example, audio-video delay measurement. In the present scheme, this is addressed by an extrapolation method.

Extrapolation Process

In the present embodiment using the above described scan directions, if the detected times measured for each region are plotted against vertical location, a straight line is expected. Extrapolating along this line to a fixed point vertically within the picture or camera field of view will yield a time which is invariant irrespective of the vertical location of the generating device with respect to the scan of the camera. This idea is now described in greater detail by means of FIGS. 12A and 12B.

As the pulses are used in a digital context, the pulses comprise digitized versions of a continuous waveform, such as shown in FIG. 6. The peaks of the respective pulses can be calculated by well-known interpolation techniques, as described above.

In FIG. 12A, the top two pulse plots show the interpolated pulses with their centres marked on the horizontal axis by a dot. These two pulses appear in two detection regions, Region A and Region B, which may correspond for example to regions 1002 and 1004 of FIG. 10. The bottom plot shows where this peak would appear if the times of the top two pulses were extrapolated to a point in the direction of update of the camera, such as the centre line of the camera field of view.

In FIG. 12A, the pulses are negative going. In other embodiments, the pulses may be positive going.

Figure 12B:
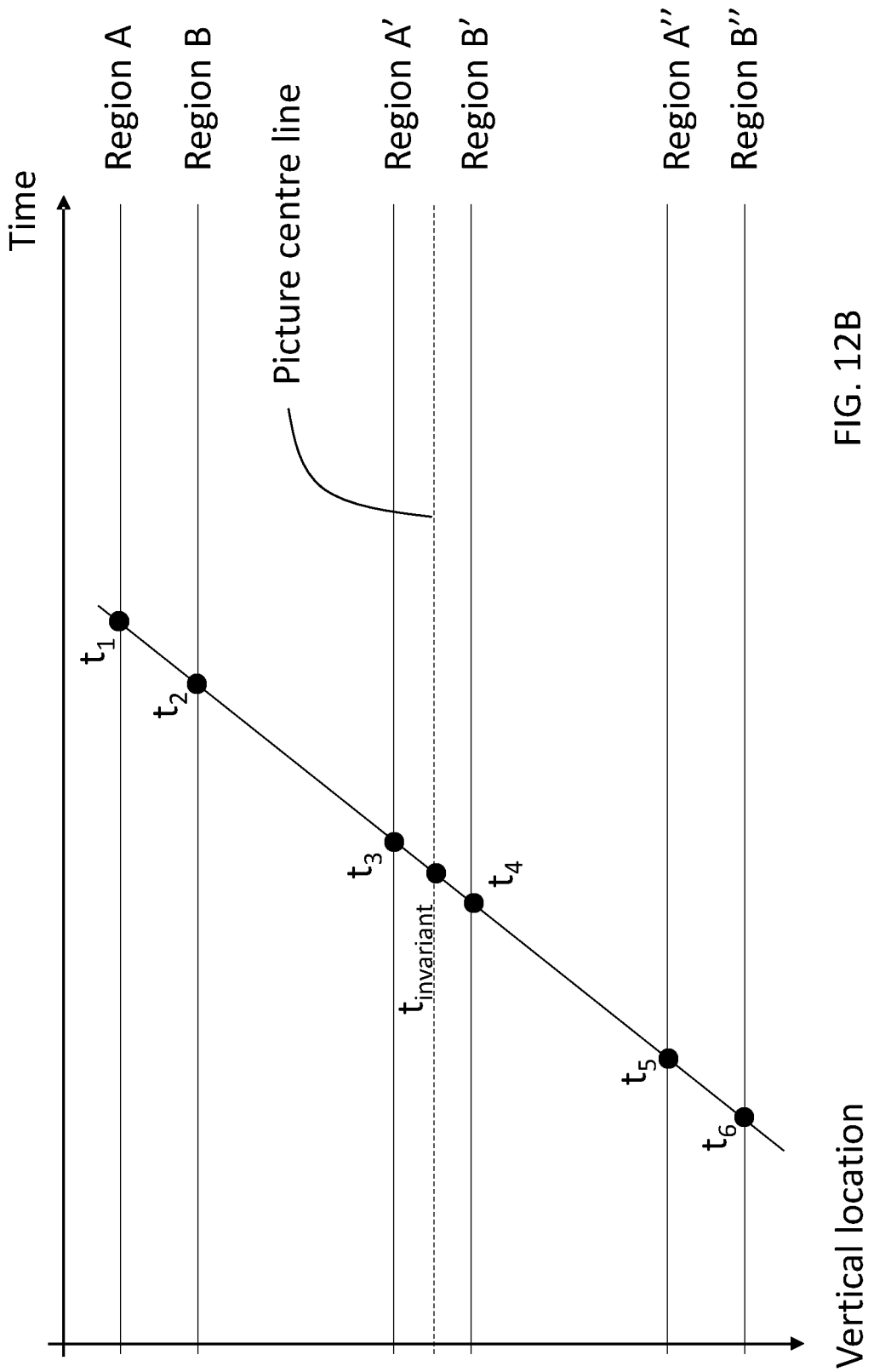
FIG. 12B shows the extrapolation of detected pulse peaks to a fixed vertical location.

FIG. 12B shows the extrapolation process. FIG. 12B shows a graph of time of pulse peak detection against vertical location in the camera field of view.

Continuing to refer to FIG. 12B, when the smartphone is held in the upper half of the camera field of view, the pulse is monitored in Region A and Region B. The peak of the pulse appears at time $t_1$ in Region A and the peak of the pulse appears at time $t_2$ in Region B.

When the smartphone is held in the vertical centre of the camera field of view, the pulse is monitored in Region A' and Region B'. The peak of the pulse appears at time $t_3$ in Region A' and the peak of the pulse appears at time $t_4$ in Region B'.

When the smartphone is held in the lower half of the camera field of view, the pulse is monitored in Region A" and Region B". The peak of the pulse appears at time $t_5$ in Region A" and the peak of the pulse appears at time $t_6$ in Region B".

As noted above, the scan direction of the smartphone is perpendicular to the scan direction of the rolling shutter mechanism. Due to the related scan directions of the smartphone and the camera, the times at which the pulses appear in each of Regions A, B, A', B', A" and B" are linearly related with respect to vertical location within the camera field of view.

In other words, it is possible to draw a straight line between times $t_1$, $t_2$, $t_3$, $t_4$, $t_5$ and $t_6$, as they vary with respect to vertical location with respect to the camera field of view.

In this embodiment, regardless of where the smartphone is held in the camera field of view, the times at which the peak occurs in the respective regions (for e.g., regions A, B or A', B' or A" and B") can be extrapolated to a fixed point vertically in the camera field of view. This time is shown as $t_{invariant}$ in the graph of time vs. vertical location as shown in FIG. 12B. As can be seen, all of the time pairs $t_1$, $t_2$ and $t_3$, $t_4$, and $t_5$, $t_6$ can be extrapolated to $t_{invariant}$. Thus, $t_{invariant}$ will not change depending on the vertical location of the smartphone in the camera field of view.

In summary, a plurality of regions of a screen is monitored in a video of the screen. A plurality of detected times at which a single event appears in the plurality of regions is determined. By extrapolating the detected times to another region, a time at which the single event would be detected at the another region is calculated. This calculated time is used during a process of time delay measurement between the video signal and another signal.

In a preferred embodiment, time $t_{invariant}$ is used as the time of the temporal event in the video test pattern, for measuring the delay between the temporal event in the video test pattern and temporal events in other signals (such as other video signals or an audio signal). In a preferred embodiment, $t_{invariant}$ is the time of the temporal event as it would appear in a region at the centre of the screen.

As discussed, the fixed reference point does not have to be the centre line; it could be the top, or any other vertical position in the picture. The vertical picture centre is preferred as that is the most likely source of sound in a picture. For example, the lips of a talking actor would most likely appear at the vertical centre of the camera field of view. Choosing the fixed reference points to be the centre line of the picture reduces the error between global and rolling shutter cameras to +/−0.5 frames at the top and bottom of the picture.

Of course, the relative positions described above will change if the scan directions of the camera and the smartphone is changed; the present example will work in any arrangement wherein the scan direction of the camera is perpendicular to the scan direction of the smartphone.

In the present example, the horizontal location of the display or smartphone does not significantly affect the apparent pulse timing and so can be ignored.

Here, "perpendicular" may mean "substantially perpendicular", or perpendicular enough in order for the pulse peaks times in each region to be linearly related as described above.

The present invention is no invited to the came a or the device captured by the camera having an update cycle.

In some embodiments, the camera is not a rolling shutter camera but can be a global shutter camera. In this case, the extrapolation process will be conducted along a line that is vertical (that is, the times at which the temporal event is detected in each detection region are the same). Thus, in a global shutter camera, the time at which the temporal event would be detected in the selected region of the video is the same as the time at which the temporal event is detected in other regions.

This allows the user of the video test pattern generator to be "shutter agnostic" because the present inventive method will work with both global shutter and rolling shutter cameras the global shutter being a special case of the rolling shutter wherein in a global shutter camera the extrapolation is vertical.

In other embodiments, the device displaying the video test pattern also does not update, but instead displays an entire frame of the video test pattern at the same time. In such situations, any rolling shutter camera will still capture timing pulses at different times in dependence on the position of a monitored region. An example of a video test pattern display device which does not have an update cycle is an array of LEDs (see section entitled "Alternative embodiments", below).

Colour of the Pulse

In video test patterns with multiple functionalities, multiple features or test elements need to be visible on-screen. Further, branding and promotional text may need to be displayed. A principal embodiment of the present invention comprises fading the screen or display from the image displayed on the screen or display to a colour pulse; this pulse may be used in timing measurement, as described. It is important that this colour pulse is distinguishable from any feature on the screen graphics not involved in the timing mechanism or colour pulse.

In various embodiments, the background could be white and the pulse may be black; the background may be black and the pulse may be white, or the background could be grey and the pulse may be of a colour chosen along the Cb or Cr axes. However, due to the required variety of features in the video test pattern, a background with more colour variety is usually required.

When generating the timing pulse, the pixels on the screen are modulated as follows. The following considers a single pixel.

Letting:
RP, GP, BP be the RGB coordinates of the background pixel
RF, GF, BF be the RGB coordinates of the flash colour
Rdisplay, Gdisplay, Bdisplay be the RGB coordinates of the pixel displayed on the device screen
Then:

$$R\text{display}(t)=RF \cdot f(t)+RP \cdot (1-f(t))$$

$$G\text{display}(t)=GF \cdot f(t)+GP \cdot (1-f(t))$$

$$B\text{display}(t)=BF \cdot f(t)+BP \cdot (1-f(t)) \qquad \text{Equation [2]}$$

Note that f(t) has already been defined in the section above entitled "Example temporally matched features".

Figure 13:
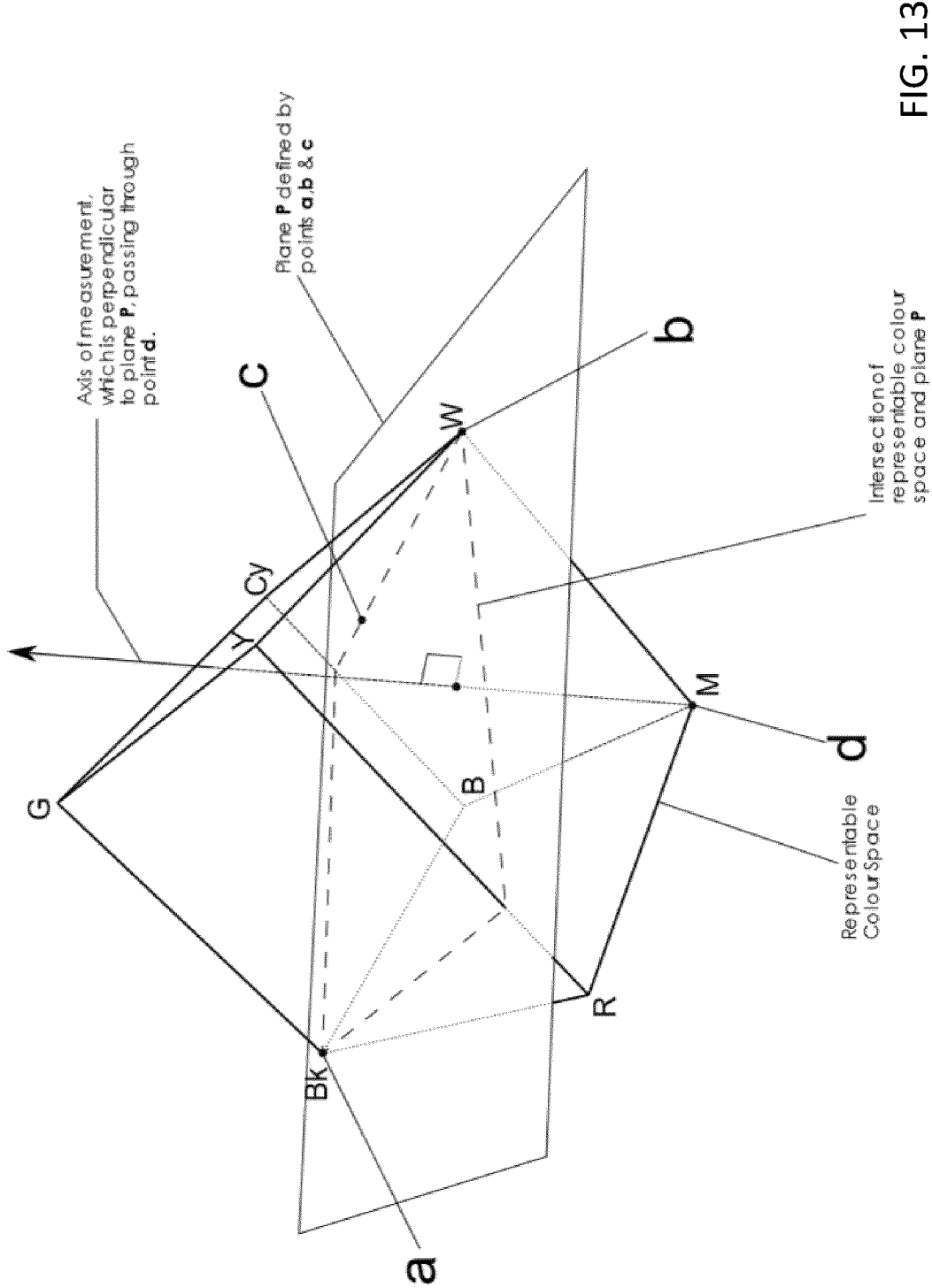
FIG. 13 shows a 3D colour space illustrating colour orthogonality as used by the video test pattern generator.

To address the issue of the background colour affecting the measurement, in a preferred embodiment, the colours on the screen are limited to colours existing on one plane through a 3D colour space, as shown in FIG. 13. FIG. 13 shows a 3D colour space, and the background colours are chosen so that they are located on plane P. The pulse colour d is selected to be as remote from plane P as possible, to maximise the distinguishability of the colour pulse over the background colours of the video test pattern.

Once a pulse colour has been selected, the colour space is rotated to form a new set of axes K, L, and M, wherein axis L is perpendicular to plane P and axes K and M are parallel to plane P with the origin of said axes defined as point d. Axis L is referred to as the measurement axis. With this set of axes, the co-ordinate along the measurement axis L is completely invariant to any colour on plane P.

The colour space of the received video may be transformed onto the new axes K, L and M using a suitable 4×4 matrix of the form:

$$\begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix} \begin{bmatrix} Y \\ C_b \\ C_r \\ 1 \end{bmatrix} = \begin{bmatrix} K \\ L \\ M \\ Z \end{bmatrix} \quad \text{Equation [3]}$$

In the above equation:
Y=luminance of a pixel in the video
$C_b$=blue difference chroma component of a pixel in the video
$C_r$=red difference chroma component of a pixel in the video
K, L and M are the transformed axes described above.
m=elements of a matrix transform to transform each pixel colour onto said axes K, L and M The specific colour space matrix solution where plane P is defined by black, white and a shade of blue, and the pulse colour d is magenta, is as follows:

$$\begin{bmatrix} -1.152 & 0.2 & -1.381 & 0.878 \\ 0 & -1.132 & -0.807 & 0.803 \\ -1.293 & -1.468 & 0.374 & 0.764 \\ 0 & 0 & 0 & 1 \end{bmatrix} \begin{bmatrix} Y \\ C_b \\ C_r \\ 1 \end{bmatrix} = \begin{bmatrix} K \\ L \\ M \\ 1 \end{bmatrix} \quad \text{Equation [4]}$$

For the purposes of pulse detection we are only interested in the measurement axis, so the only calculation required in the hardware is:

$$L = m_{21} \cdot Y + m_{22} \cdot Cb + m_{23} \cdot Cr + m_{24} \quad \text{Equation [5]}$$

Thus, for each input pixel one value L is generated which is the input to the flash detector 730.

In the preferred embodiment, where plane P is defined by black, white and a shade of blue, and the pulse colour is defined to be magenta, L can be calculated by:

$$L = 0Y - 1.132 Cb - 0.807 Cr + 0.803 \quad \text{Equation [6]}$$

In summary, first, background colours are selected from a plane P. Then a pulse colour is selected on a point d located on a line L perpendicular to plane P and maximally distant from plane P for distinguishability. A solution to a matrix equation describing rotation of the colour space is then found. The solution is constrained in that the plane formed by two of the axes (K, M) of the rotated colour space is parallel to plane P, and L is the third axis of the rotated colour space perpendicular to plane P (pulse colour d is the origin of axis L). Once the matrix solution is found, the values of K and M are discarded, and the value of L is calculated by the above equation. This is because L reflects the level of pulse colour (for e.g., magenta) in a particular frame, and because the pulse colour level is the variable of interest. L is inputted into the flash detector.

Advantageously, the colour space rotation only requires equation [6] to determine the level of pulse colour in the video test pattern. This reduces the complexity, time and computational power required to detect the presence of a flash or a pulse in the video test pattern.

In the preferred embodiment, the background colours are chosen on a plane defined by black, white and a shade of blue. In this embodiment, magenta is selected as a colour far away from this particular exemplary plane; the choice of magenta was made due to its maximal distance from plane P as defined by the colours black, white and a shade of blue.

Alternative Embodiments

Whilst most of the embodiments described herein use a screen such as a smartphone display to display the video test pattern, in other embodiments any display may be used, with the constraint that when the display is held in the field of view of the camera for capture of the video test pattern, the scan direction (if any) of the display is assumed to be perpendicular to an assumed scan direction of the camera.

Thus, instead of using a smartphone or tablet as the video test pattern generator, a grid of LEDs or other light source can be used. Such a light source may be modulated with a shaped timing pulse with a continuous function rather than the sampled display of a screen as described above. For instance, an array of one or more LEDs or other light generating devices may generate a flat 2D or 3D object capable of generating a shaped light pulse. These may utilise a diffusion filter.

The video and audio test patterns could also be displayed upon a TV monitor or other display. Alternatively, a light source which can generate a pulse of light or dip in brightness or transient colour change can be used.

The present invention can be used not only with rolling shutter cameras, but also with global shutter cameras. When global shutter cameras are used, the above exemplary extrapolation process would resolve to a vertical line, because the pulse peak appears at the same time in all detection regions. In practical use, there is no need to know whether the camera is using a global shutter mechanism or a rolling shutter mechanism. It is assumed that the camera uses a rolling shutter mechanism with an update direction perpendicular to the updating display showing the video test pattern. If this assumption is not correct and the camera is in fact using a global shutter mechanism, this does not affect the measurement of $t_{invariant}$, and $t_{invariant}$ would fall on the vertical line between the co-occurring peak times.

The above embodiments are described by way of example. Many variations are possible without departing from the invention.

The invention claimed is:

1. A method for rolling shutter compensation during signal delay measurement, comprising:
    displaying a video test pattern on a display, said video test pattern having a temporal event;
    capturing a video of the display, by a camera;
    monitoring a plurality of regions of the display in the video;
    detecting times at which the temporal event appears in each monitored region of the display in the video; and
    extrapolating the detected times to calculate the time at which said temporal event would appear at a selected region of the video.

2. The method of claim 1 wherein:
    said camera has an assumed update direction; and
    said plurality of regions are located at different points in the assumed update direction.

3. The method of claim 1 wherein said selected region is different to all of the monitored regions, or wherein said selected region is the same as one of the monitored regions.

4. The method of claim 1 wherein:
    said display has a first update direction;
    said camera is a rolling shutter camera with a second update direction;
    said first update direction is substantially perpendicular to the second update direction; and
    said plurality of regions are located at different points in the second update direction.

5. The method of claim 1 wherein said selected region corresponds to a center of the captured video.

6. The method of claim 1 wherein the calculated time of said temporal event is used to measure the delay between a video signal corresponding to the video test pattern, and one or more other signals;
   optionally wherein at least one of said other signals is another video signal; and
   optionally wherein at least one of said other signals is an audio signal.

7. The method of claim 1 wherein the temporal event corresponds to a peak, or another part, of a variable of the video test pattern; and
   optionally wherein said variable varies sinusoidally, as a polynomial or as a square wave over time.

8. The method of claim 7 wherein said variable of the video test pattern is the opacity or intensity of a color of at least part of the video test pattern.

9. The method of claim 8 wherein said color of at least part of the video test pattern is selected to be on a line L perpendicular to a plane P in 3D color space, and wherein the colors of the rest of the video test pattern are selected from said plane P,
   optionally wherein the color space of the video test pattern is transformed by means of a color space matrix transform so that two of the axes of the rotated color space are parallel to plane P and said line L comprises a third axis of the rotated color space;
   optionally wherein detection of the temporal event comprises detecting the color of the video along said third axis L;
   and:
   optionally wherein said color of at least part of the video test pattern is magenta or substantially magenta, whilst the colors of the rest of the video test pattern are black, white and a shade of blue, or substantially black, white and a shade of blue.

10. The method of claim 1 wherein the number of monitored regions is two or four.

11. The method of claim 1 wherein said display comprises one of:
   a smartphone display or tablet display;
   a grid of LEDs; and
   a television monitor.

12. The method of claim 1 wherein the video test pattern includes a data pattern comprising information on at least one of:
   (i) the height or width of the display;
   (ii) the dimensions and/or location of the display with respect to the data pattern; and
   (iii) the relative positions of the monitored regions within the video test pattern;
   and wherein the method includes using information in said data pattern to locate said display and said monitored regions in the video captured by the camera.

13. A test pattern generator for rolling shutter compensation during signal delay measurement, the test pattern generator configured to:
   generate a video test pattern for display on a display, said video test pattern having a temporal event;
   wherein the temporal event corresponds to a peak, or another part, of a variable of the video test pattern;
   wherein said variable relates to a color of at least part of the video test pattern; and
   wherein said color of at least part of the video test pattern is selected to be on a line L perpendicular to a plane P in 3D color space, and wherein the colors of a rest of the video test pattern are selected from said plane P;
   optionally wherein the color space of the video test pattern is transformed by means of a color space matrix transform so that two of the axes of the rotated color space are parallel to plane P and said line L comprises a third axis of the rotated color space; and
   optionally wherein detection of the temporal event comprises detecting the color of the video along said third axis L.

14. The test pattern generator of claim 13 wherein at least one of:
   (i) said variable comprises the opacity or intensity of said color; and
   (ii) said color of at least part of the video test pattern is magenta or substantially magenta, whilst the colors of the rest of the video test pattern are black, white and a shade of blue, or substantially black, white and a shade of blue.

15. The test pattern generator of claim 13 wherein said display comprises one of:
   a smartphone display or tablet display;
   a grid of LEDs; and
   a television monitor.

16. A test pattern analyzer for rolling shutter compensation during signal delay measurement, the test pattern analyzer configured to:
   monitor a plurality of regions of a display in a video captured by a camera;
   detect times at which a temporal event of a video test pattern appears in each monitored region of the display in the video; and
   extrapolate the detected times to calculate the time at which said temporal event would appear at a selected region of the video;
   wherein said selected region is the same as one of the monitored regions, or different to all of the monitored regions.

17. The test pattern analyzer of claim 16 wherein said plurality of regions are located at different points in an assumed rolling shutter update direction of the camera.

18. The test pattern analyzer of claim 16 wherein said selected region corresponds to a centre of the captured video.

19. The test pattern analyzer of claim 16 configured to use the calculated time of said temporal event to measure the delay between a video signal corresponding to the video test pattern, and one or more other signals;
   optionally wherein at least one of said other signals is another video signal; and
   optionally wherein at least one of said other signals is an audio signal.

20. The test pattern analyzer of claim 16 wherein the number of monitored regions is two or four.

* * * * *